US011541449B2

(12) United States Patent
Cosgrave et al.

(10) Patent No.: US 11,541,449 B2
(45) Date of Patent: Jan. 3, 2023

(54) RIVET DISPENSER RELOADING SYSTEMS AND METHODS OF USE THEREOF

(71) Applicants: HOWMET AEROSPACE INC., Pittsburgh, PA (US); CenterLine (Windsor) Limited, Windsor (CA)

(72) Inventors: Stuart Cameron Cosgrave, LaSalle (CA); Kyle Alexander Wasyliniuk, Essex (CA); Donald J. Spinella, Greensburg, PA (US); Daniel Bergstrom, Sarver, PA (US); Gino N. Iasella, Pittsburgh, PA (US)

(73) Assignees: HOWMET AEROSPACE INC., Pittsburgh, PA (US); CENTERLINE (WINDSOR) LIMITED, Windsor (CA)

( * ) Notice: Subject to any disclaimer, the term of this patent is extended or adjusted under 35 U.S.C. 154(b) by 0 days.

(21) Appl. No.: 17/288,346

(22) PCT Filed: Dec. 13, 2019

(86) PCT No.: PCT/US2019/066115
§ 371 (c)(1),
(2) Date: Apr. 23, 2021

(87) PCT Pub. No.: WO2020/123885
PCT Pub. Date: Jun. 18, 2020

(65) Prior Publication Data
US 2021/0379647 A1 Dec. 9, 2021

Related U.S. Application Data

(60) Provisional application No. 62/778,938, filed on Dec. 13, 2018.

(51) Int. Cl.
*B21J 15/32* (2006.01)
*B21J 15/02* (2006.01)
(Continued)

(52) U.S. Cl.
CPC ............. *B21J 15/32* (2013.01); *B21J 15/027* (2013.01); *B23K 11/0066* (2013.01); *B23K 11/3063* (2013.01)

(58) Field of Classification Search
CPC ..... B21J 15/32; B21J 15/027; B23K 11/0066; B23K 11/3063; B23K 11/36; B23K 11/314; B65G 47/256; B25C 1/001; B23P 19/006
See application file for complete search history.

(56) References Cited

U.S. PATENT DOCUMENTS 1,230,563 A * 6/1917 Claiborne ............... B25C 1/001
227/112
5,465,868 A 11/1995 Bonomi
(Continued)

FOREIGN PATENT DOCUMENTS

GB 2569127 A * 6/2019 ............ B21J 15/025
JP 2003236672 8/2003
(Continued)

OTHER PUBLICATIONS

International Search Report and Written Opinion of the International Search Authority for International Application No. PCT/US2019/066115 dated May 20, 2020.

Primary Examiner — Lee A Holly
(74) Attorney, Agent, or Firm — K&L Gates LLP

(57) ABSTRACT

Rivet dispenser reloading systems and methods of use thereof are provided. A non-limiting embodiment of a rivet dispenser reloading system comprises a receiving member defining a channel therein, and a first gate. The rivet receiving member comprises a first port and a second port that communicate with the channel. The first port is configured to receive rivets. The second port is configured to selectively engage with a rivet dispenser and introduce rivets to the rivet dispenser. The channel extends between the first port and the (Continued)

second port and is configured to transport rivets from the first port to the second port in a series arrangement and in a preselected orientation. The first gate is in communication with the second port and is selectively positionable between a first configuration inhibiting movement of rivets through the second port, and a second configuration enabling movement of rivets through the second port.

20 Claims, 34 Drawing Sheets

(51) Int. Cl.
*B23K 11/00* (2006.01)
*B23K 11/30* (2006.01)

(56) References Cited

U.S. PATENT DOCUMENTS

| | | | |
|---|---|---|---|
| 5,964,393 A * | 10/1999 | Feldpausch | B21J 15/32 227/135 |
| 8,690,037 B2 | 4/2014 | Wenzel et al. | |
| 2006/0037843 A1* | 2/2006 | Auriol | B65G 47/256 198/757 |
| 2009/0266866 A1 | 10/2009 | Davies et al. | |
| 2010/0059486 A1 | 3/2010 | Aoyama et al. | |
| 2017/0072454 A1* | 3/2017 | Wilcox | B23P 19/006 |

FOREIGN PATENT DOCUMENTS

| | | |
|---|---|---|
| JP | 2008213032 | 9/2008 |
| JP | 2008-229717 A | 10/2008 |
| KR | 10-2012-0108280 A | 10/2012 |
| KR | 10-1832112 B1 | 2/2018 |
| WO | 2019118659 A1 | 6/2019 |

\* cited by examiner

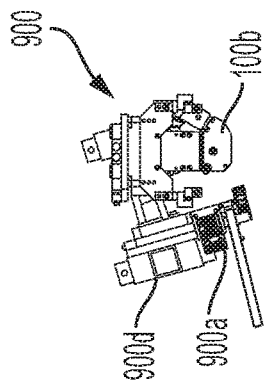
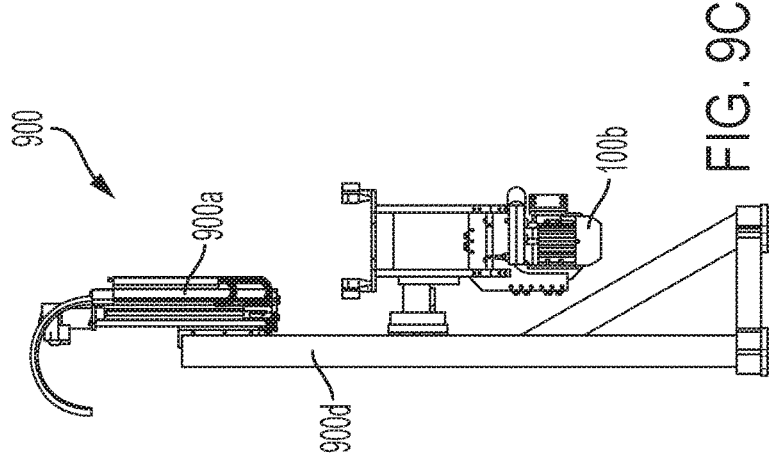
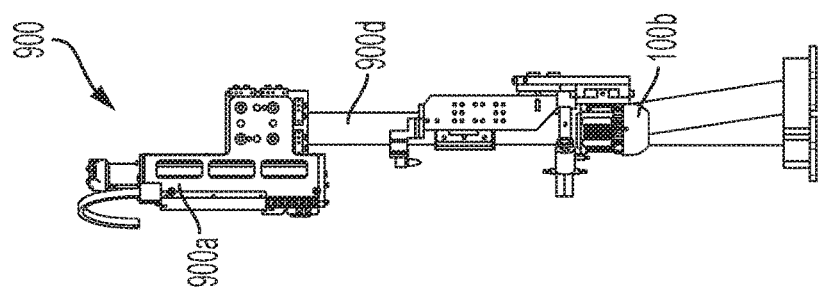
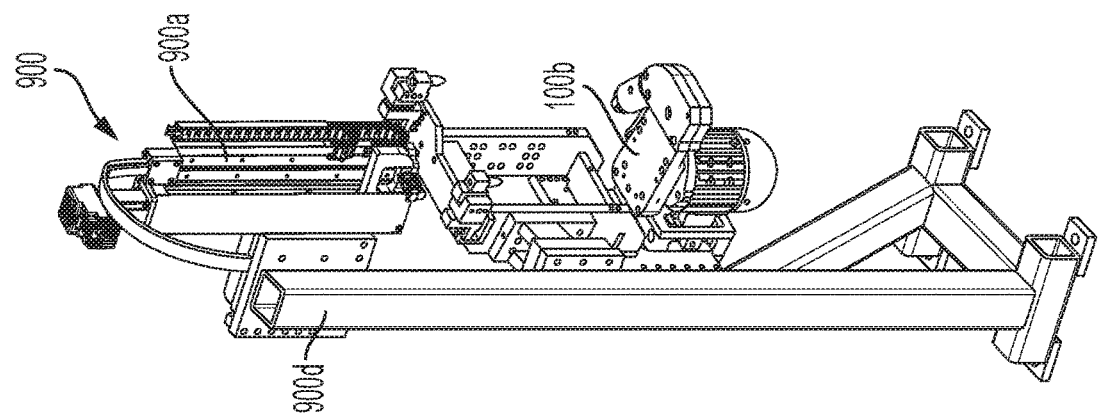

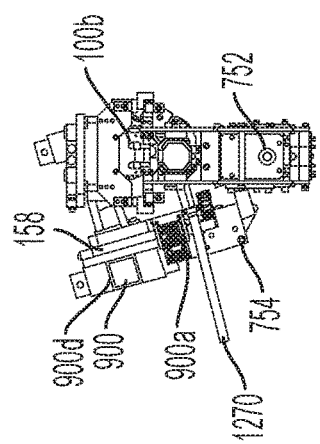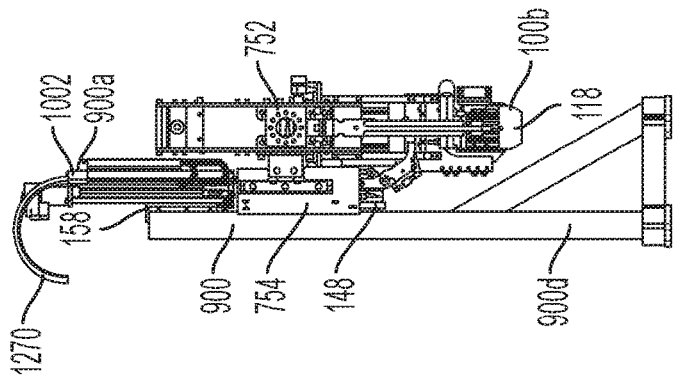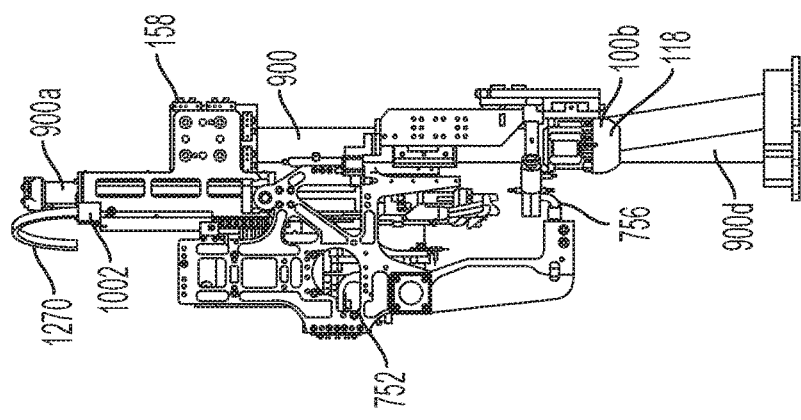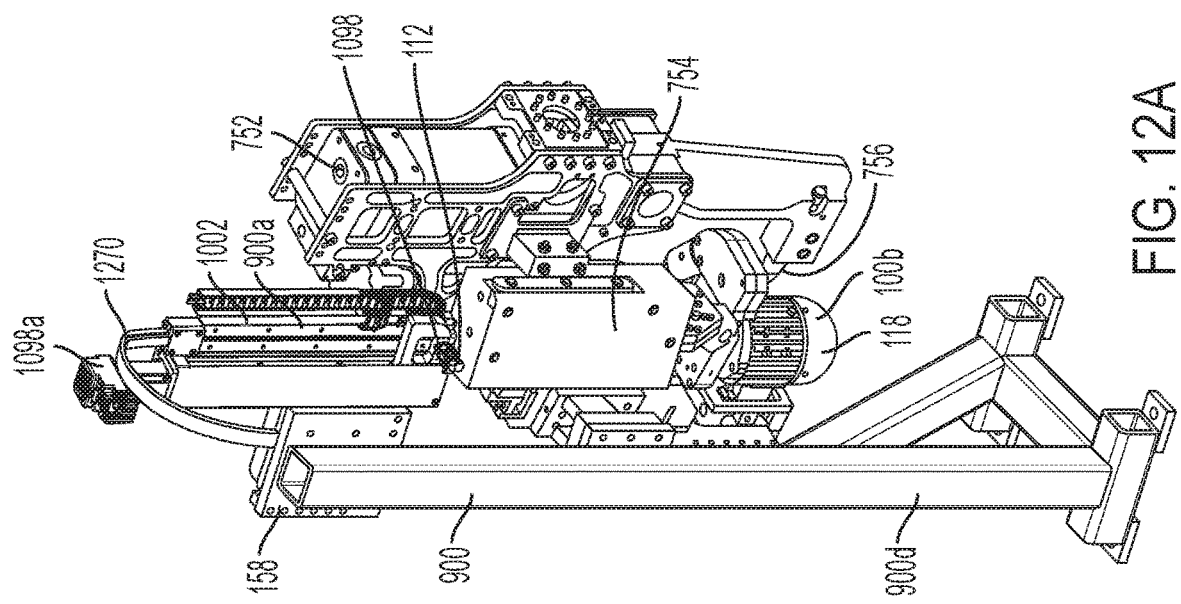

RIVET DISPENSER RELOADING SYSTEMS AND METHODS OF USE THEREOF

FIELD OF USE

The present disclosure relates to rivet dispenser reloading systems and methods of use thereof.

BACKGROUND

Current methods of fastening together work pieces, such as fastening sheets together, can include the use of, for example, self-piercing rivets and/or flow drill rivets. Other methods of fastening can require feeding rivets to a resistance spot rivet welding system. There are challenges with feeding rivets to a resistance spot rivet welding system.

SUMMARY

In an aspect, a rivet dispenser reloading system is provided. The rivet dispenser reloading system comprises a receiving member defining a channel therein, and a first gate. The rivet receiving member comprises a first port and a second port. The first port communicates with the channel and is configured to receive rivets. The second port communicates with the channel and is configured to selectively engage with a rivet dispenser and introduce rivets to the rivet dispenser. The channel extends between the first port and the second port and is configured to transport rivets from the first port to the second port in a series arrangement and in a preselected orientation. The first gate is in communication with the second port. The first gate is selectively positionable between a first configuration inhibiting movement of rivets through the second port, and a second configuration enabling movement of rivets through the second port.

In another aspect, a method for reloading rivets into a rivet dispenser used with a resistance spot rivet welding system is provided. The method comprises receiving and storing a plurality of rivets in a series arrangement and in a preselected orientation within a channel of a rivet receiving member of a rivet dispenser reloading system. The rivet dispenser reloading system comprises a gate associated with the channel. The gate is selectively positionable between a first configuration inhibiting movement of rivets from the channel, and a second configuration enabling movement of rivets from the channel. The method comprises aligning a rivet dispenser of a resistance spot rivet welding system with the rivet receiving member utilizing an alignment member in communication with the resistance spot rivet welding apparatus. The method comprises introducing the plurality of rivets stored in the channel into the rivet dispenser in series and in the preselected orientation via the gate.

It is understood that the inventions disclosed and described in this specification are not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples, and the manner of attaining them, will become more apparent, and the examples will be better understood, by reference to the following description taken in conjunction with the accompanying drawings, wherein:

FIG. 9A is a perspective view of a non-limiting embodiment of a rivet dispenser reloading system according to the present disclosure;

FIG. 9B is a right-side elevational view of the rivet dispenser reloading system of FIG. 9A;

FIG. 9C is a front elevational view of the rivet dispenser reloading system of FIG. 9A;

FIG. 9D is a top view of the rivet dispenser reloading system of FIG. 9A;

FIG. 12A is a perspective view showing a non-limiting embodiment of a rivet dispenser reloading system according to the present disclosure aligned with an embodiment of a resistance spot rivet welding apparatus;

FIG. 12B is a right-side elevational view of the rivet dispenser reloading system and the aligned resistance spot rivet welding apparatus of FIG. 12A;

FIG. 12C is a front elevational view of the rivet dispenser reloading system and the aligned resistance spot rivet welding apparatus of FIG. 12A; and FIG. 12D is a top view of the rivet dispenser reloading system and the aligned resistance spot rivet welding apparatus of FIG. 12A.

Corresponding reference characters indicate corresponding parts throughout the several views. The exemplifications set out herein illustrate certain non-limiting embodiments, in one form, and such exemplifications are not to be construed as limiting the scope of the appended claims in any manner.

DETAILED DESCRIPTION OF NON-LIMITING EMBODIMENTS

Figure 1A:
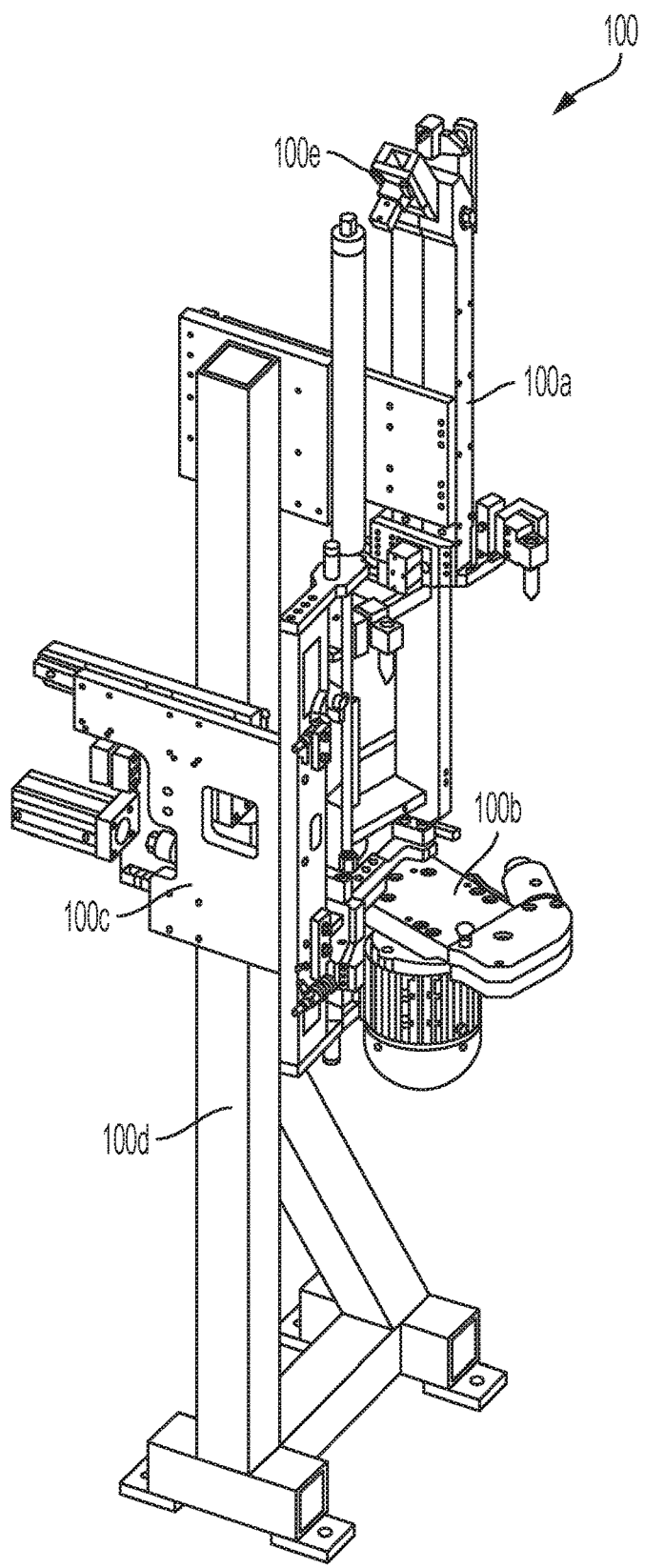
FIG. 1A is a perspective view of a non-limiting embodiment of a rivet dispenser reloading system according to the present disclosure.
Figure 1B:
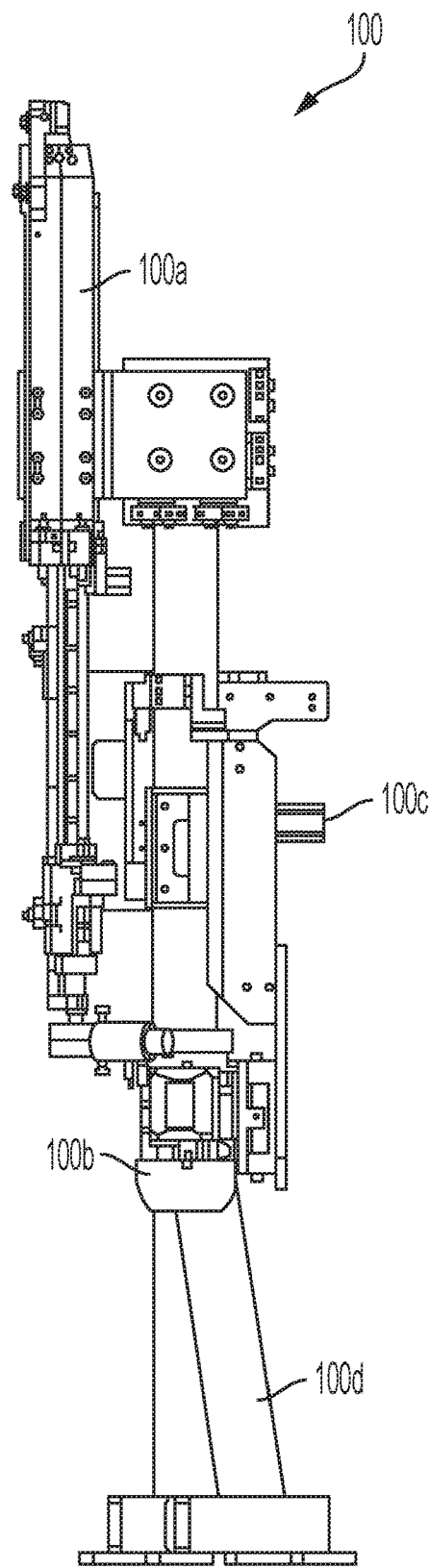
FIG. 1B is a right-side elevational view of the rivet dispenser reloading system of FIG. 1A.

Various examples are described and illustrated herein to provide an overall understanding of the structure, function, and use of the disclosed systems, apparatus, and methods. The various examples described and illustrated herein are non-limiting and non-exhaustive. Thus, the inventions are not limited by the description of the various non-limiting and non-exhaustive examples disclosed herein. Rather, the inventions are defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various non-limiting embodiments disclosed and described in this specification can comprise, consist of, or consist essentially of the features and characteristics as variously described herein.

Any reference herein to "various embodiments," "some embodiments," "one embodiment," "an embodiment," or a like phrase means that a particular feature, structure, or characteristic described in connection with the example is included in at least one embodiment. Thus, appearances of the phrases "in various embodiments," "in some embodiments," "in one embodiment," "in an embodiment," or like phrases in the specification do not necessarily refer to the same embodiment. Furthermore, the particular described features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments, without limitation. Such modifications and variations are intended to be included within the scope of the present embodiments.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural and the use of a plural noun includes the singular, unless the context of the usage requires otherwise.

As used herein, a referenced element or region that is "intermediate" two other elements or regions means that the referenced element/region is disposed between, but is not necessarily in contact with, the two other elements/regions. Accordingly, for example, a referenced element that is "intermediate" a first element and a second element may or may not be adjacent to or in contact with the first and/or second elements, and other elements may be disposed between the referenced element and the first and/or second elements.

Resistance Spot Rivet (RSR™) technology is a new resistance welding joining technology that can allow joining of a variety of parts and assemblies made from various combinations of materials. RSR™ technology employs rivets (e.g., metallic rivets) of various geometries and materials to offer a selection of solutions to match each joining scenario. In RSR™ technology, rivets may be applied to a joint using conventional resistance spot welding guns (e.g., transguns). The welding guns can be paired with a robotic manipulator and/or a pedestal welder and integrated into a system of auxiliary components. The components may perform operations including, for example, rivet handling, rivet sorting and orientation, rivet staging and feeding, rivet transfer, and presentation of the rivet to the electrode of the welding gun. Each joint created by an RSR™ riveting system consumes a single rivet. A rivet source, i.e., a rivet dispenser, may be a component of the RSR™ riveting system. In certain systems, the robotically manipulated welding gun can be decoupled from the rivet dispenser in order to maximize application flexibility. Periodic replenishment of the rivet dispenser may be required when decoupled. The frequency of replenishment can be determined by the production application.

The present disclosure is directed to systems for reloading rivets carried in a rivet dispenser for a riveting apparatus such as, for example, a resistance spot rivet welding system. A rivet dispenser reloading system, according to the present disclosure, can be located proximal to the location at which rivets are robotically installed on a part assembly, such as, for example, an automotive part assembly. The rivet dispenser reloading system may not be directly coupled to the robotic manipulator and welding gun during the welding process. In certain non-limiting embodiments, the rivet dispenser reloading system can comprise a frame that can be located within reach of the robotic manipulator and within a fenced-off space or other safe operating space for operation of the robotic manipulator. In various non-limiting embodiments, a single rivet reloading system can be utilized by multiple robotic manipulators.

FIGS. 1A-D illustrate a non-limiting embodiment of a rivet dispenser reloading system 100 according to the present disclosure. As illustrated, the rivet dispenser reloading system 100 can comprise a first assembly 100a, a second assembly 100b, a third assembly 100c, a fourth assembly 100d, and a fifth assembly 100e. In various other non-limiting embodiments, as shown in FIGS. 9A-D, a rivet dispenser reloading system 900 can comprise a first assembly 900a, a second assembly 100b, and a fourth assembly 900d. As shown in FIGS. 1A and 9A, the fourth assembly 100d, 900d is configured to be disposed on a floor or other foundation surface. The first assembly 100a, 900a can be connected to and supported by fourth assembly 100d, 900d. The second assembly 100b and third assembly 100c, if present, can be connected to the fourth assembly 100d, 900d. The fifth assembly 100e, if present, can be connected to and supported by the first assembly 100a.

Figure 1C:
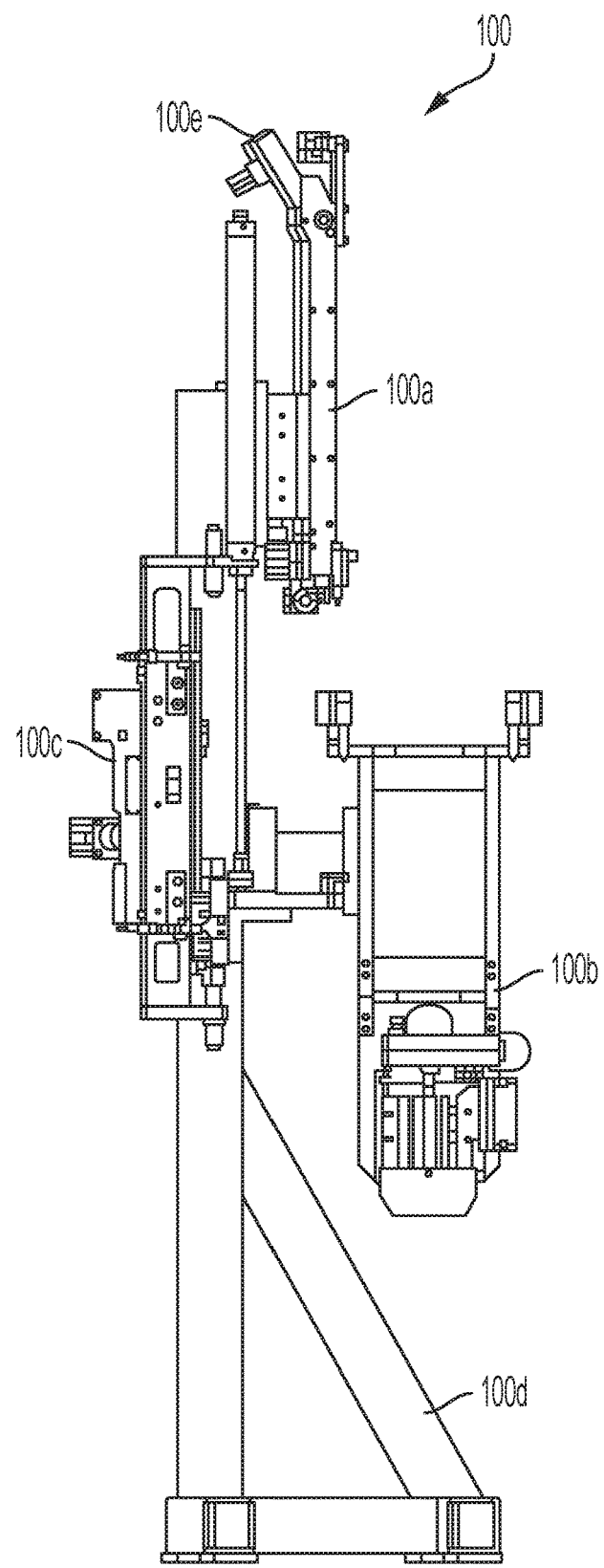
FIG. 1C is a front elevational view of the rivet dispenser reloading system of FIG. 1A.
Figure 1D:
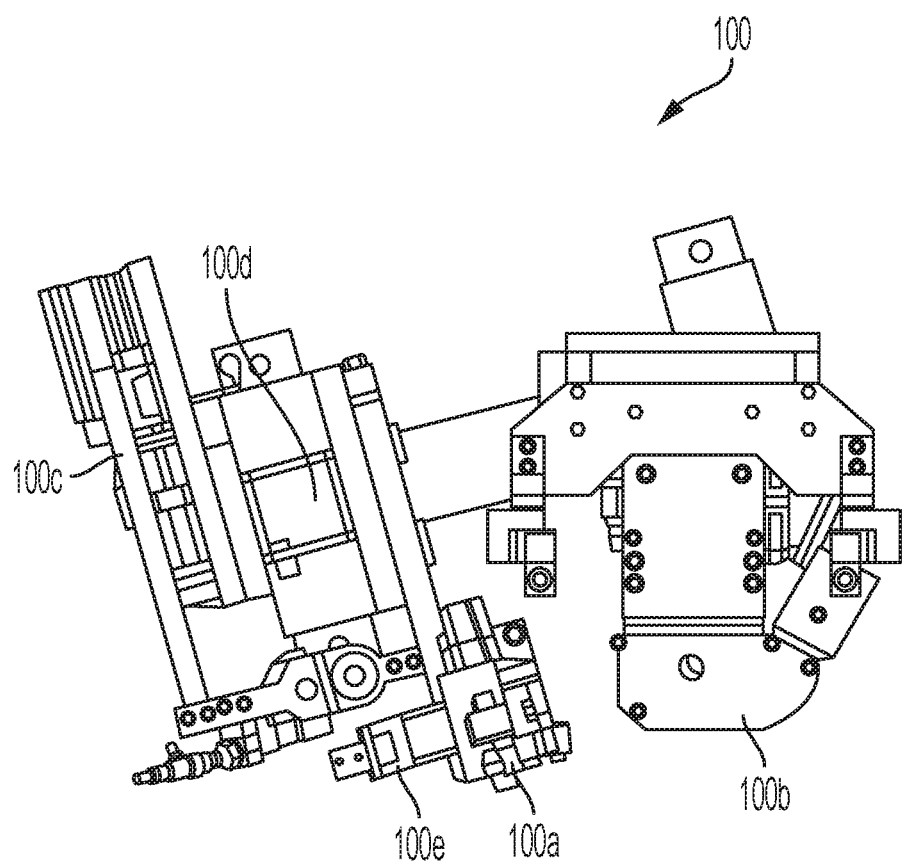
FIG. 1D is a top view of the rivet dispenser reloading system of FIG. 1A.
Figure 2A:
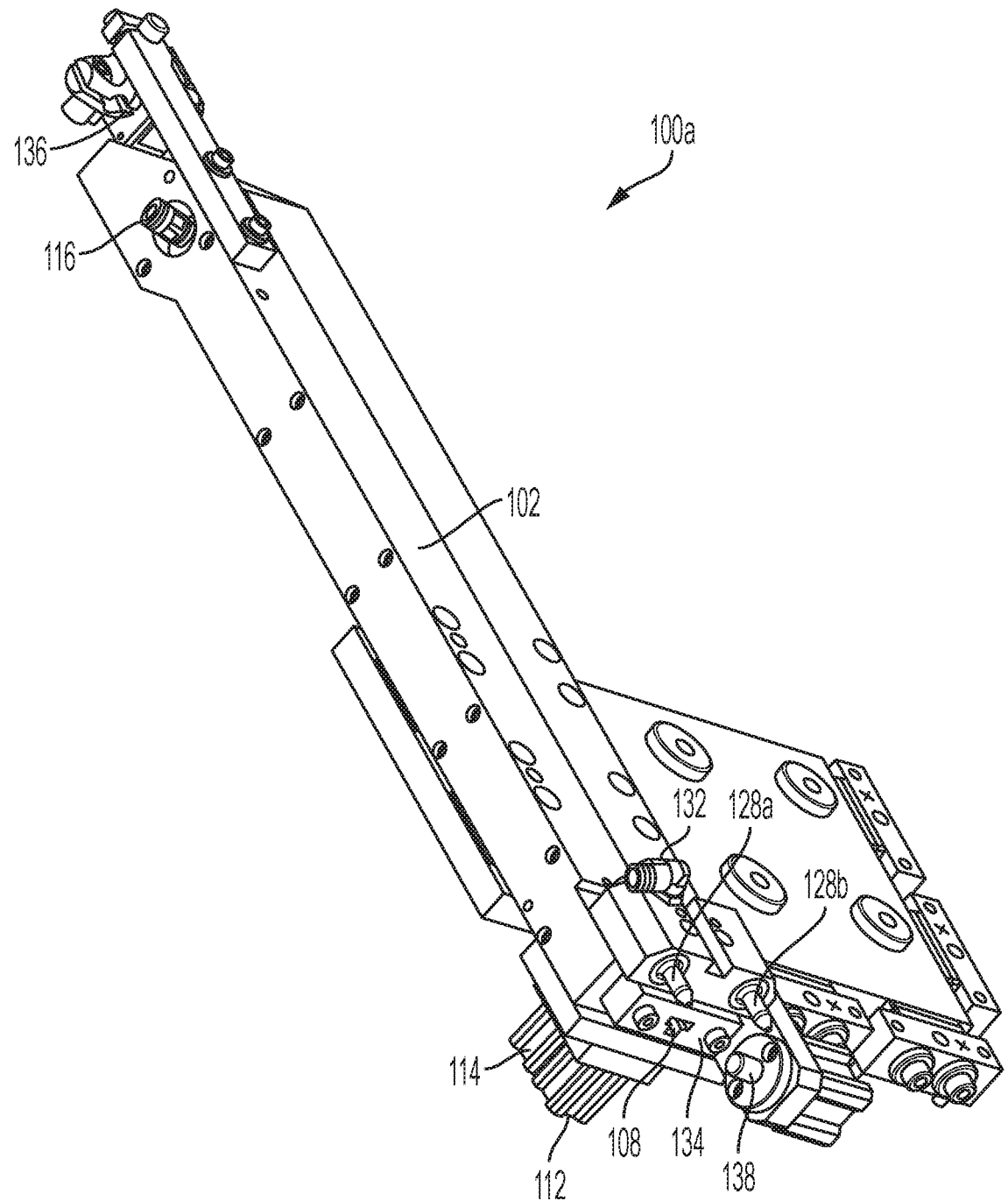
FIG. 2A is a perspective view of a first assembly of the rivet dispenser reloading system of FIG. 1A.
Figure 2B:
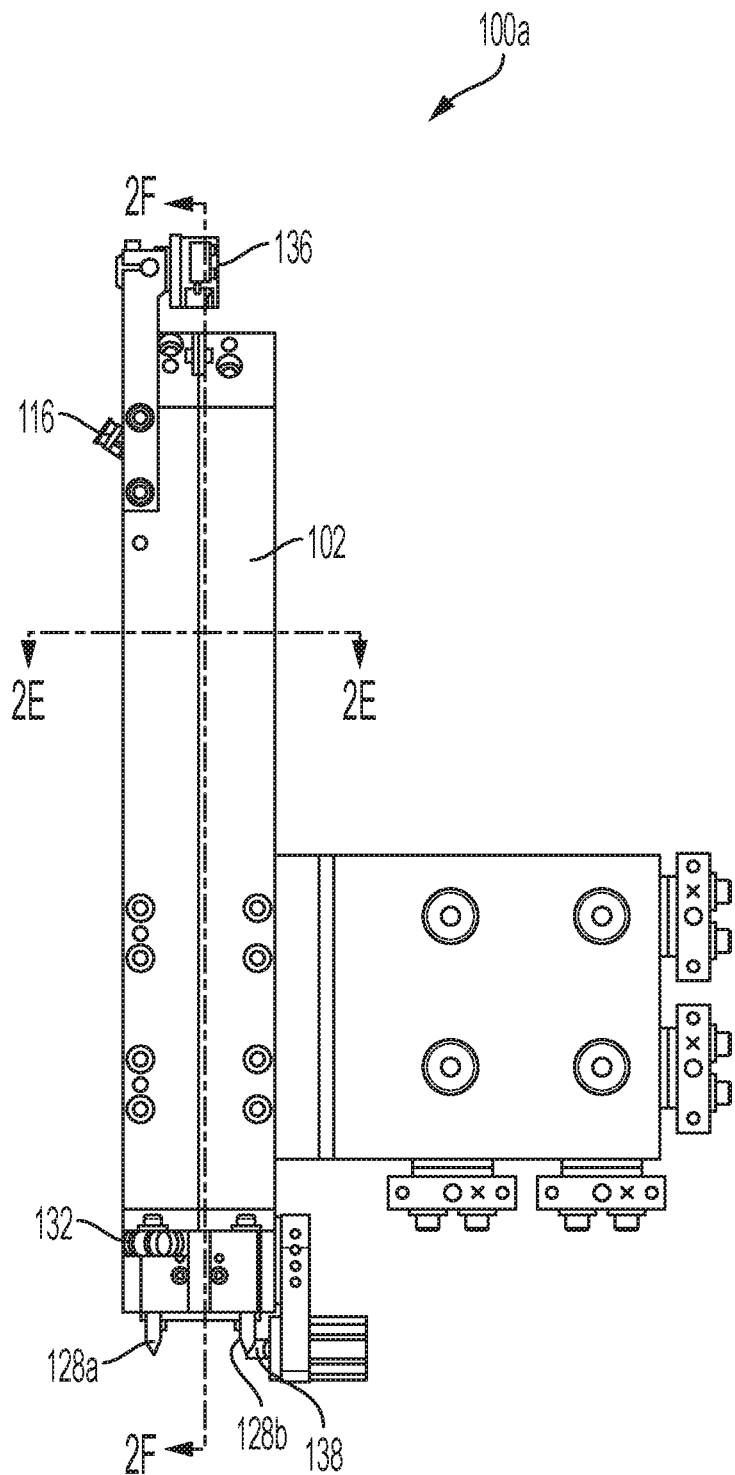
FIG. 2B is a front elevational view of the first assembly of FIG. 2A.
Figure 2C:
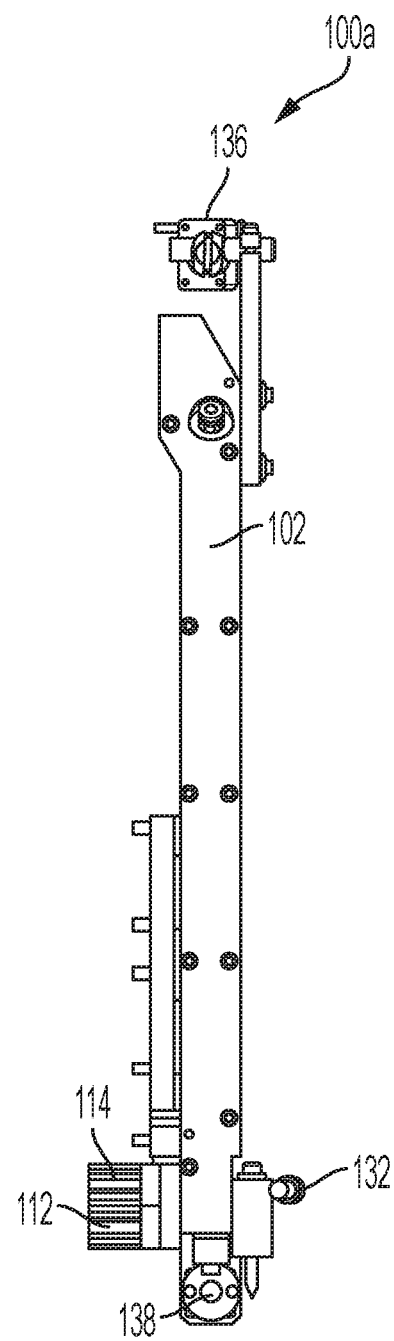
FIG. 2C is a right-side elevational view of the first assembly of FIG. 2A.
Figure 2D:
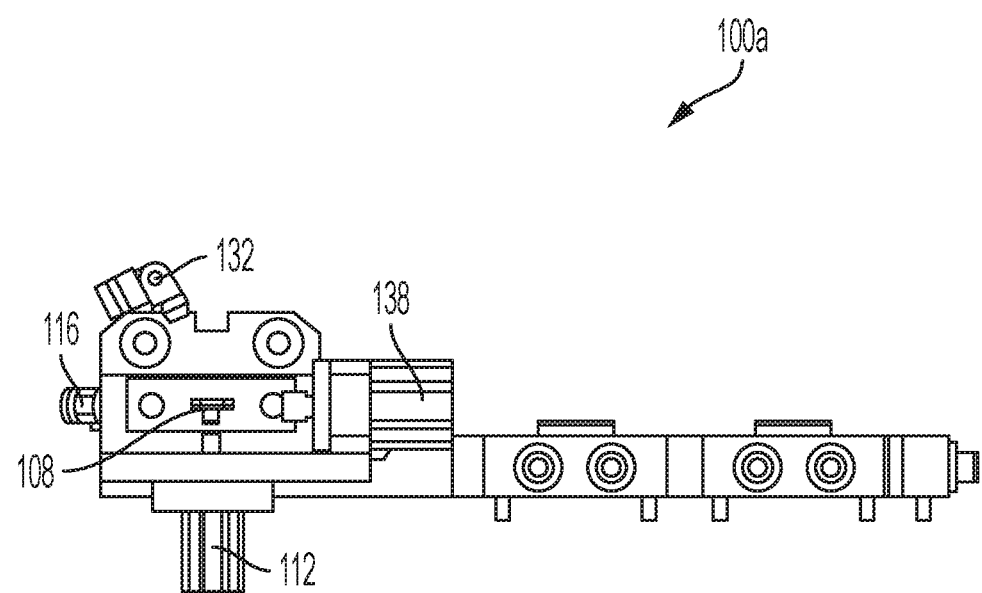
FIG. 2D is a bottom view of the first assembly of FIG. 2A.
Figure 2E:
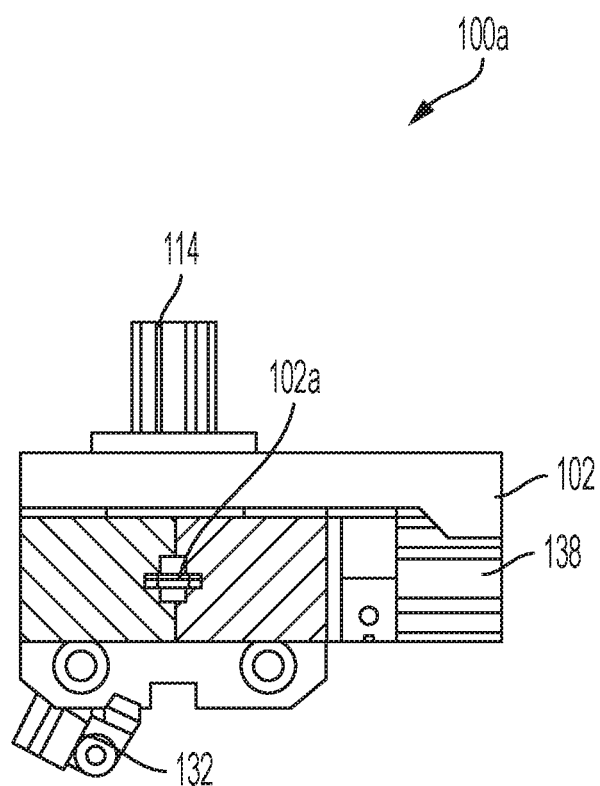
FIG. 2E is a cross-sectional top view of the first assembly of FIG. 2A taken along the line 2E-2E shown in FIG. 2B, in the direction of the arrows.
Figure 2F:
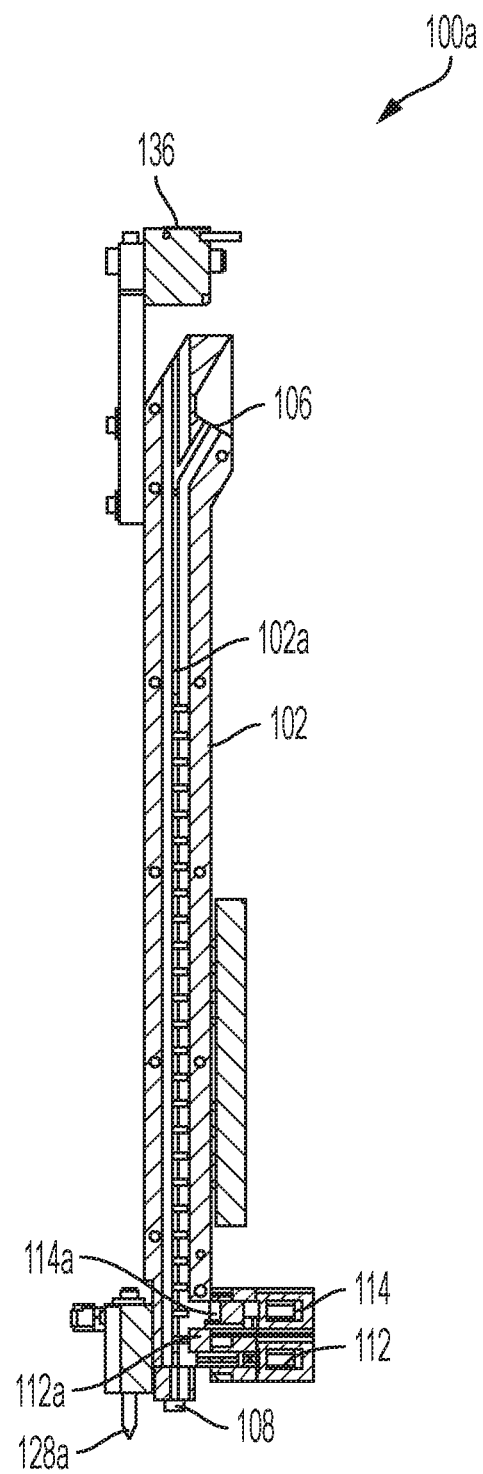
FIG. 2F is a cross-sectional side view of the first assembly of FIG. 2A taken along the line 2F-2F shown in FIG. 2B, in the direction of the arrows.
Figure 3A:
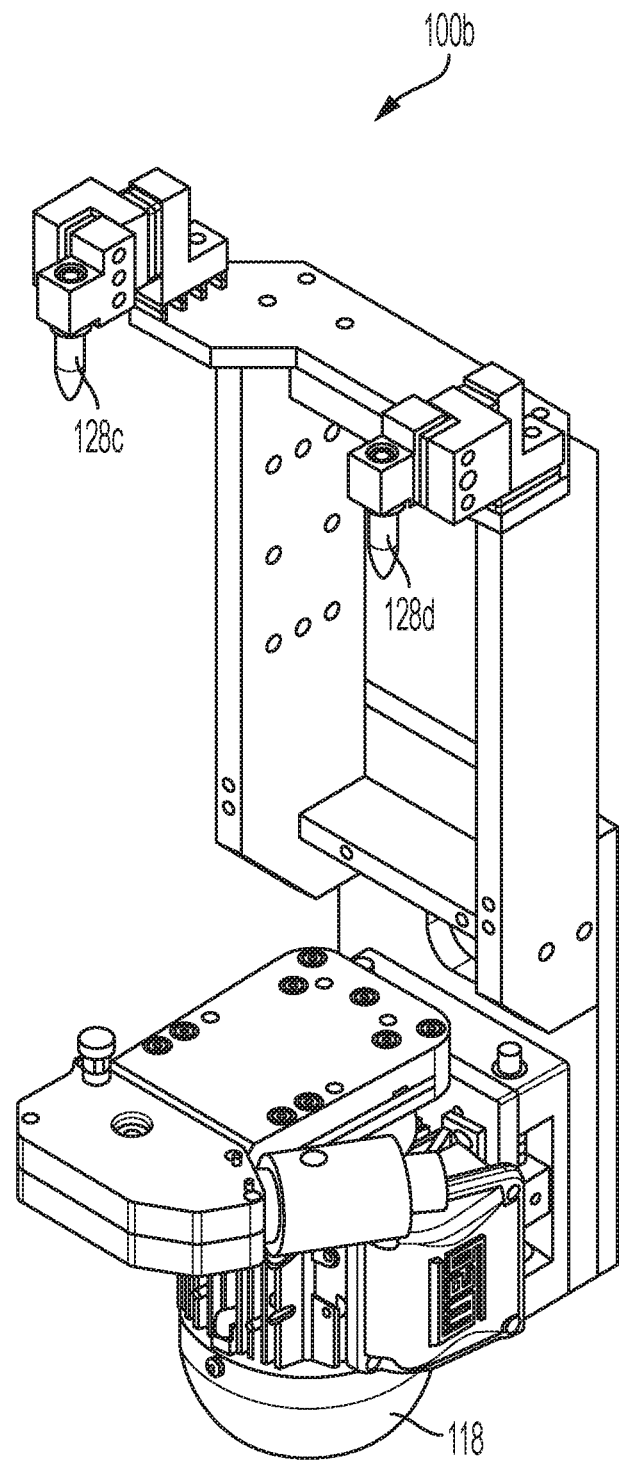
FIG. 3A is a perspective view of a second assembly of the rivet dispenser reloading system of FIG. 1A.
Figure 3B:
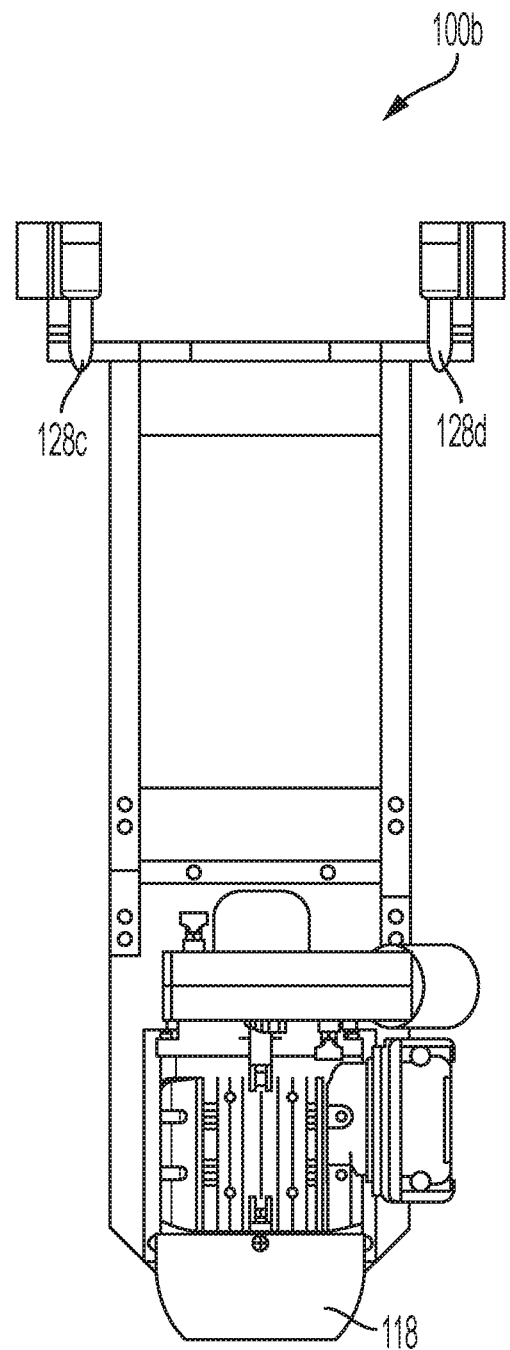
FIG. 3B is a front elevational view of the second assembly of FIG. 3A.
Figure 3C:
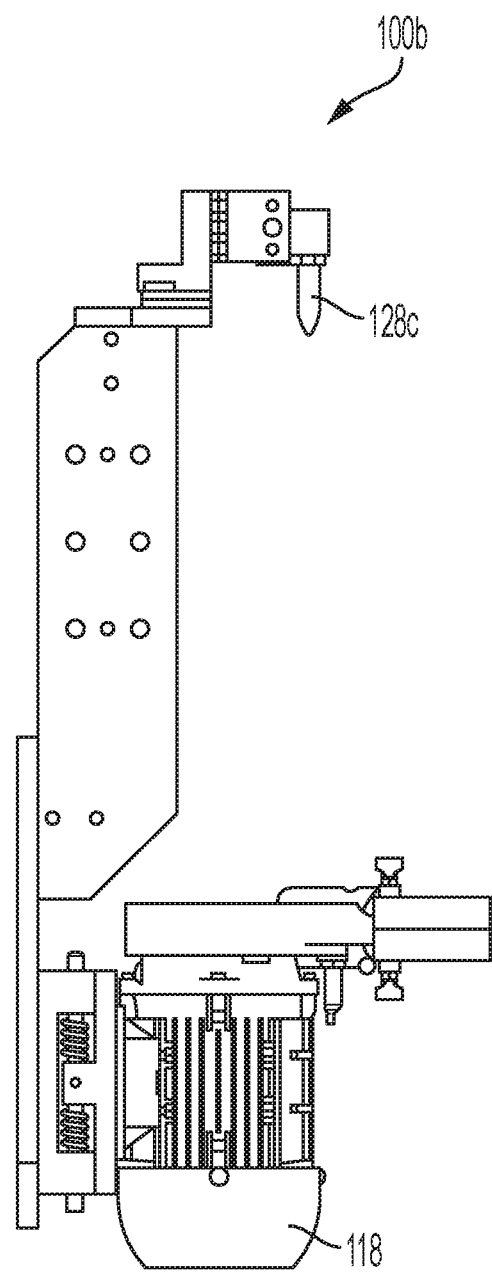
FIG. 3C is a left-side elevational view of the second assembly of FIG. 3A.
Figure 3D:
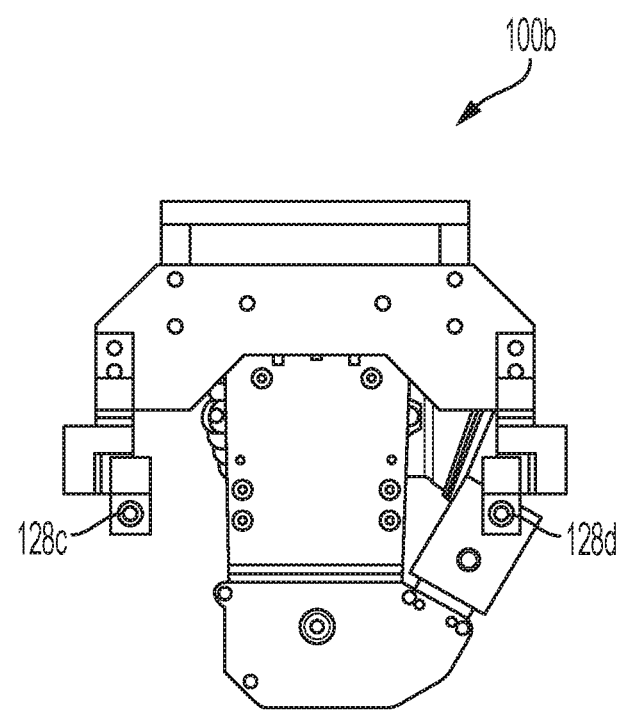
FIG. 3D is a top view of the second assembly of FIG. 3A.
Figure 4A:
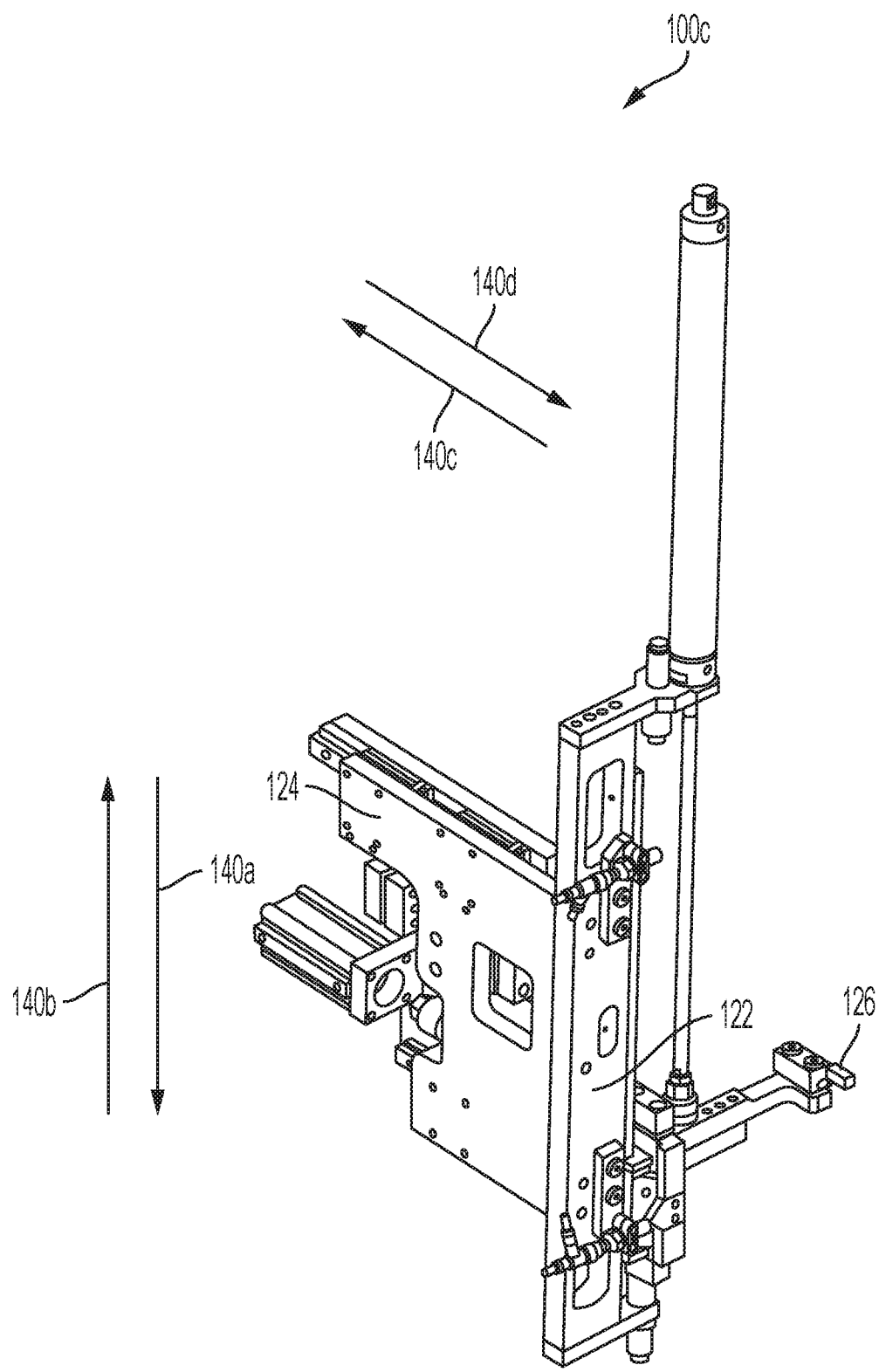
FIG. 4A is perspective view of a third assembly of the rivet dispenser reloading system of FIG. 1A.
Figure 4B:
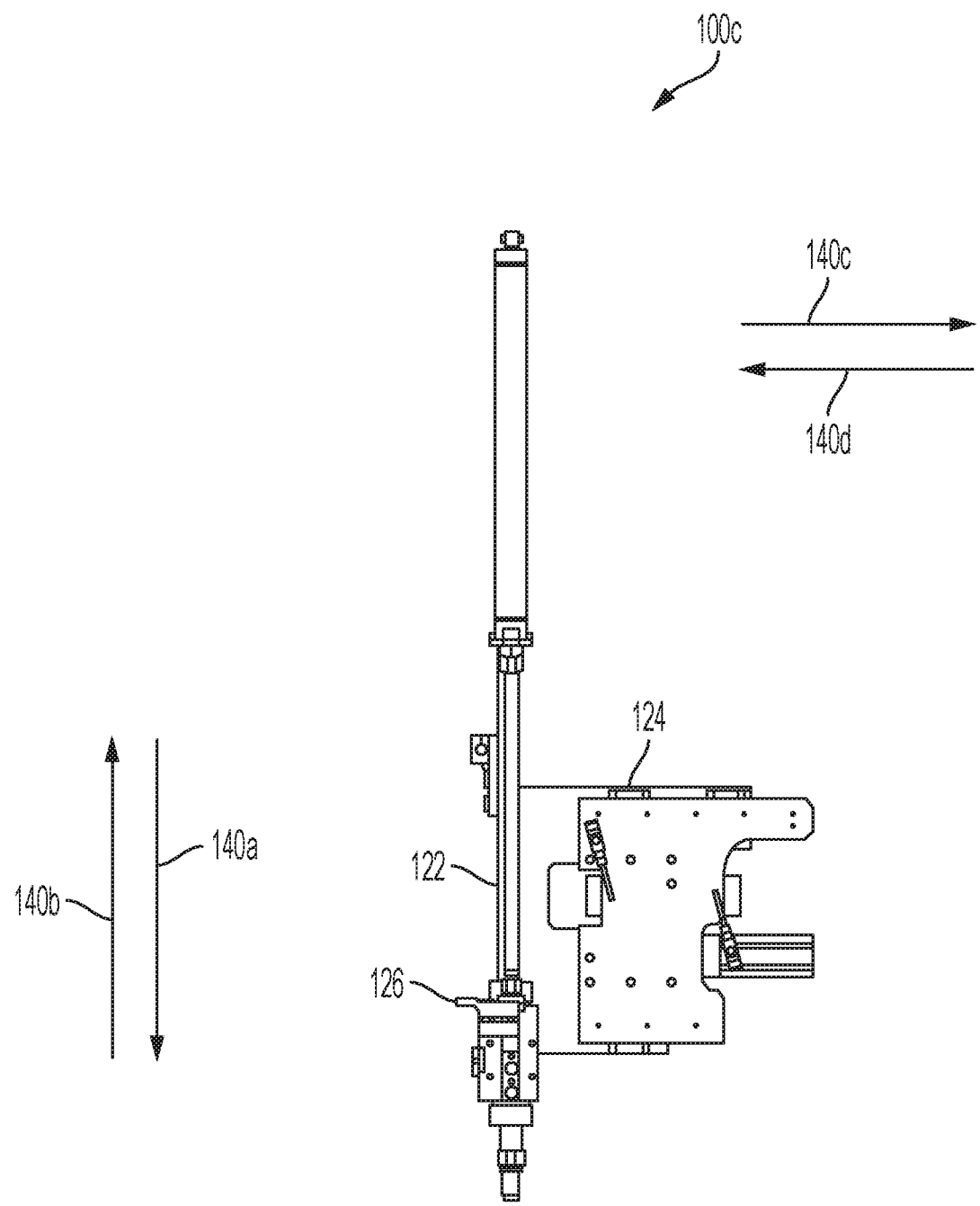
FIG. 4B is a right-side elevational view of the third assembly of FIG. 4A.
Figure 4C:
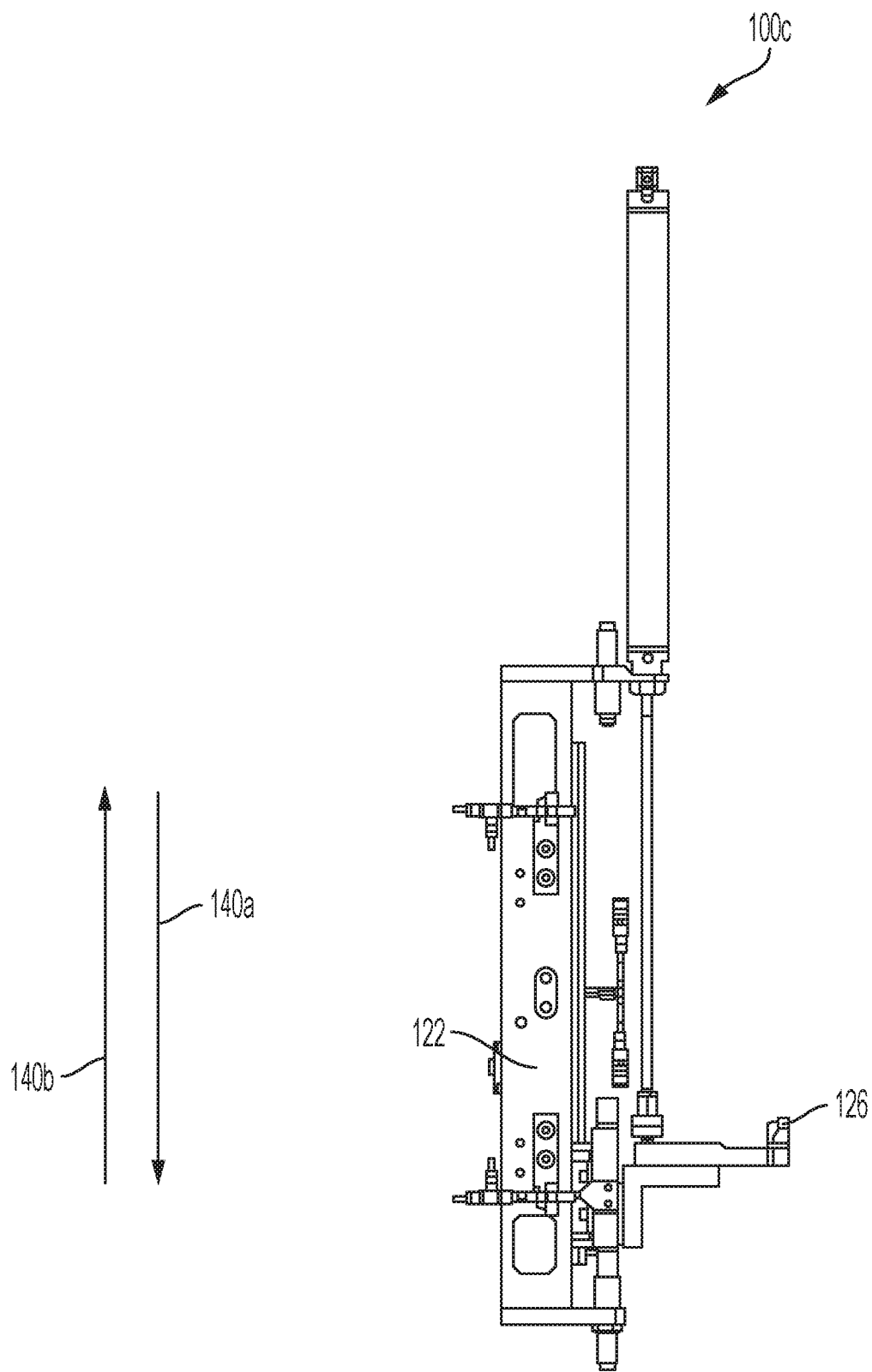
FIG. 4C is a front elevational view of the third assembly of FIG. 4A.
Figure 4D:
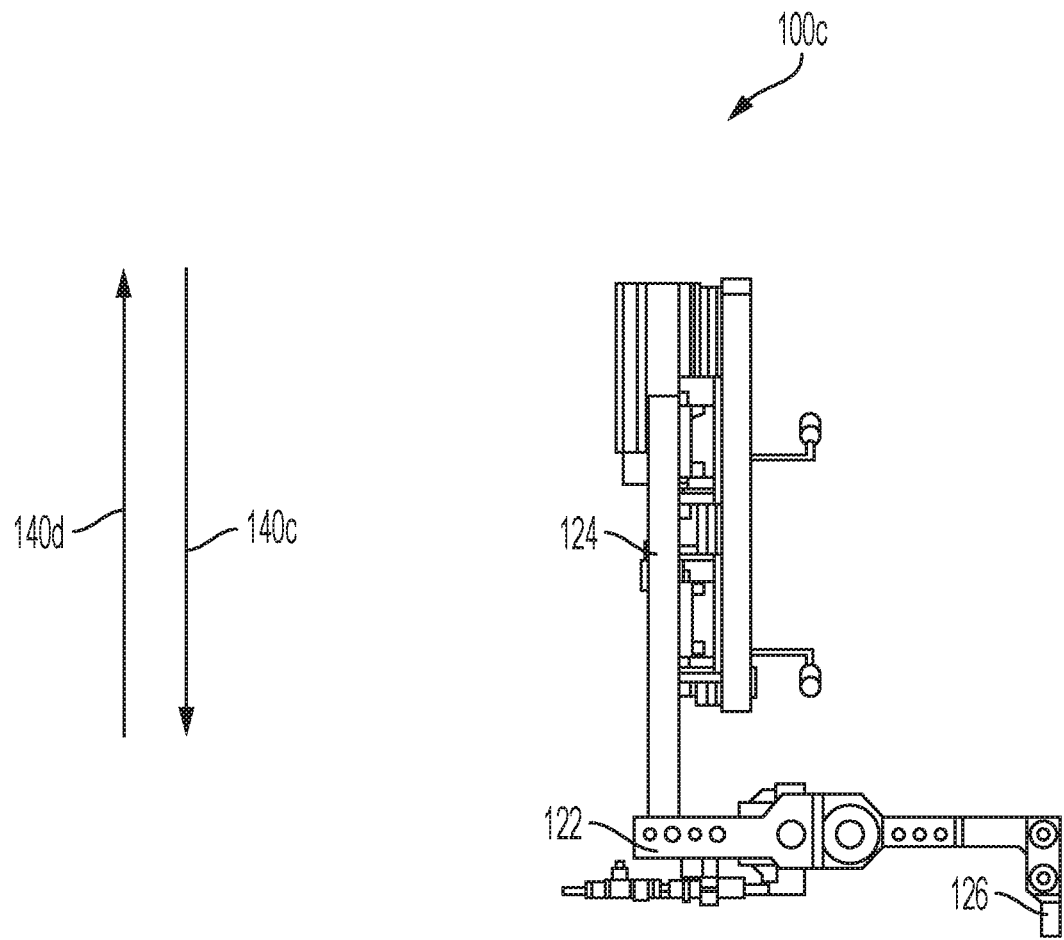
FIG. 4D is a top view of the third assembly of FIG. 4A.
Figure 8:
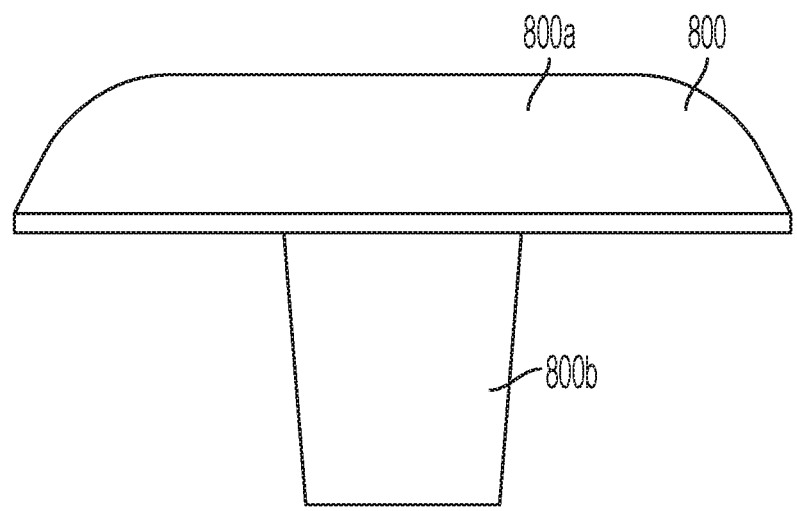
FIG. 8 is a front elevational view of a non-limiting embodiment of a rivet that may be used with certain non-limiting embodiments of a rivet dispenser reloading system according to the present disclosure.

FIGS. 2A-F show first assembly 100a of the rivet dispenser reloading system 100 illustrated in FIGS. 1A-D. The first assembly 100a can be structured to receive and store rivets. One non-limiting embodiment of a rivet 800 used in, for example, a resistance riveting process is shown in FIG. 8. The rivet 800 comprises a head portion 800a and a stem portion 800b and can comprise a metal or metal alloy suitable for resistance spot rivet welding. As best shown in FIGS. 2E and 2F, which are sectional views taken along lines 2E-2E and 2F-2F, respectively, shown in FIG. 2B, the first assembly 100a can comprise a rivet receiving member 102 defining a channel 102a therein. The rivet receiving member 102 can comprise a first port 106 and a second port 108. The first port 106 can be in communication with the channel 102a and configured (e.g., shaped and positioned) to receive rivets. The second port 108 can be in communication with the channel 102a and configured (e.g., shaped and positioned) to dispense rivets from the channel 102a and can selectively engage with a rivet dispenser and introduce rivets to the rivet dispenser. In various non-limiting embodiments, the channel 102a can be tapered from the first port 106 to the second port 108. For example, the channel 102a can narrow from the first port 106 to the second port 108.

The first port 106 can receive rivets from a fastener feeder in a series arrangement in a preselected orientation. The rivets received by the first port 106 can traverse into the channel 102a in the series arrangement and preselected orientation towards the second port 108.

The channel 102a can extend between the first port 106 and the second port 108. The channel 102a can be configured to store rivets in, and transport rivets along, channel 102a from the first port 106 to the second port 108 in a series arrangement (e.g., aligned in a row) and in a preselected orientation. The channel 102a can be configured to store a single rivet or a plurality of rivets in the series arrangement and in the preselected orientation until the rivets are dispensed through the second port 108. As such, as rivets emerge from the second port 108, they do so in series and in the preselected orientation. In various non-limiting embodiments, the rivets within the channel 102a can comprise the same dimensions or different dimensions, and/or the rivets within the channel 102a can be comprised of the same material or different materials.

In various non-limiting embodiments, a cross-section of the channel 102a can be substantially "T"-shaped. In various other non-limiting embodiments, a cross-section of the channel 102a can be suitable to accommodate a weld-stud and/or a weldnut. The channel 102a can comprise a cross-sectional shape and size suitable to accommodate one or more sizes and configurations of rivets. The cross-sectional shape and size of the channel 102a can be selected so that rivets within the channel move through the channel 102a in a series arrangement and in a preselected orientation within the rivet receiving member 102. The cross-sectional shape and size of the channel 102a can inhibit, if not prevent, jamming of rivets within the channel 102a, shingling (e.g., overlapping head portions of rivets) of rivets within the channel 102a, and gaps between successive rivets within the channel 102a. In certain non-limiting embodiments, the rivet receiving member 102 can comprise two halves that are connected together to form the rivet receiving member 102 and define the channel 102a. For example, each half can comprise a profile cut along its length and, as shown in FIG. 2E, the joined profiles define the channel 102a.

Figure 10C:
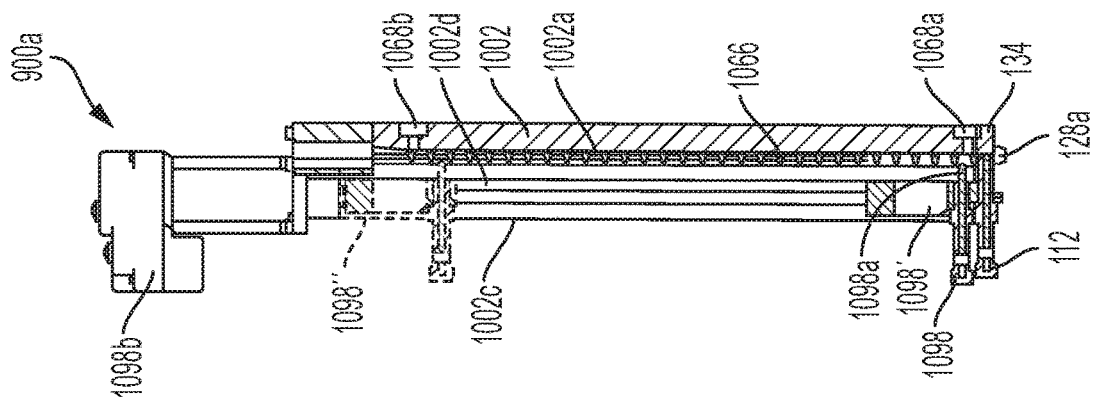
FIG. 10C is a cross-sectional side view of the first assembly of FIG. 10A taken along the line 10C-10C shown in FIG. 10B, in the direction of the arrows.
Figure 10B:
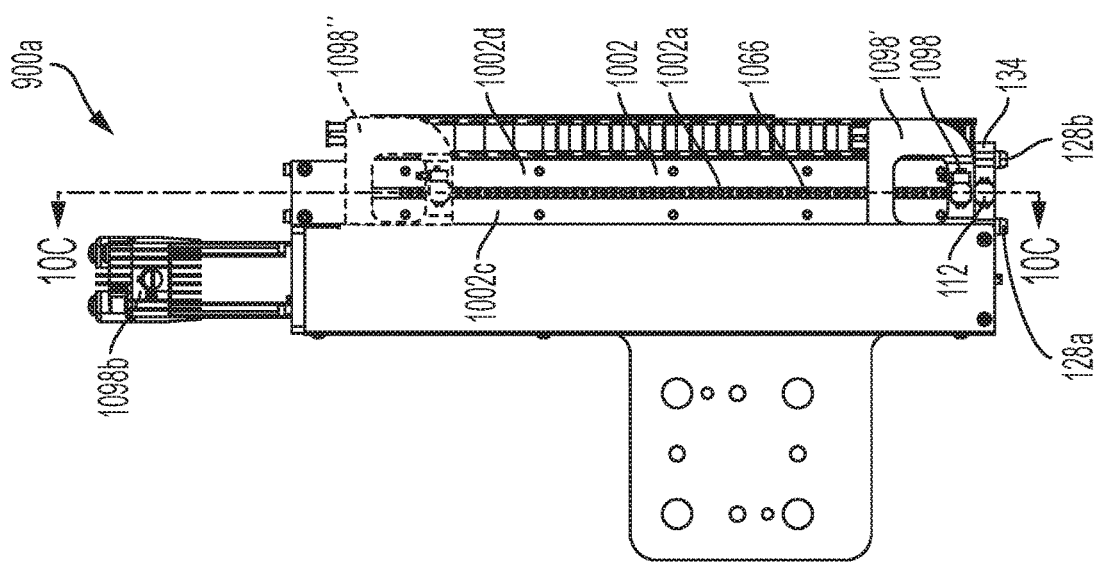
FIG. 10B is a front elevational view of the first assembly of FIG. 10A.
Figure 10A:
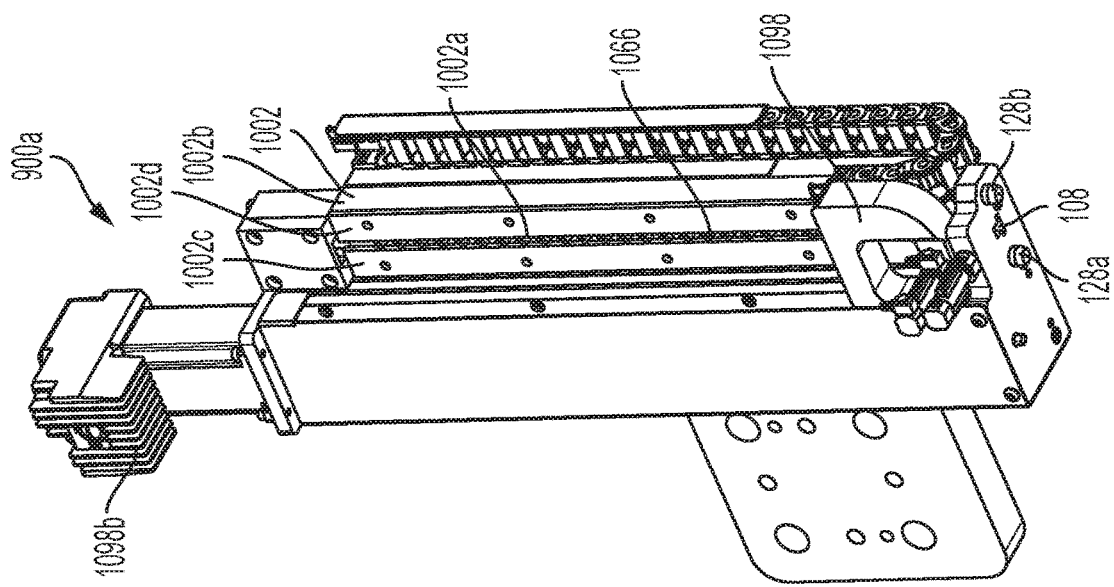
FIG. 10A is a perspective view of a first assembly of the rivet dispenser reloading system of FIG. 9A.

Referring to FIGS. 10A-C, in various non-limiting embodiments, a rivet receiving member 1002 can comprise a body 1002b and two retaining plates 1002c and 1002d. A channel can be formed within a first side of the body 1002b, and the two retaining plates 1002c and 1002d can be operatively coupled to the first side of the body 1002b and spaced apart from each other to form a channel 1002a. The channel 1002a can comprise a "T"-shaped profile. In various non-limiting embodiments, the channel 102a and/or the channel 1002a can be sized and configured to accommodate a desired rivet size. In various non-limiting embodiments where multiple rivets are used, the channel 102a and/or the channel 1002a can be sized and configured to accommodate the head portion and the stem portion of rivets that will be used.

In certain non-limiting embodiments, the rivet receiving members 102 and 902 can comprise at least one of aluminum, an aluminum alloy, magnesium, a magnesium alloy, steel, a steel alloy, a plastic, and a composite. In various non-limiting embodiments, the rivet receiving members 102 and 902 may be non-magnetic. In certain non-limiting embodiments, the rivet receiving members 102 and 902 can comprise a coating to increase wear resistance.

Referring again to FIGS. 2A-F, the rivet receiving member 102 can be oriented in space so that gravity urges rivets to move through the channel 102a from the first port 106 to the second port 108 in a series arrangement. For example, the rivet receiving member 102 can be oriented such that channel 102a is substantially vertical, which can increase the assisting force of gravity to move rivets through the channel 102a. The vertical arrangement of the rivet receiving member 102 can also facilitate simultaneous rivet reloading and weld cap dressing. Additionally, the vertical arrangement of the rivet receiving member 102 can accommodate changes to the length of the channel 108.

As shown in FIG. 2B, in certain non-limiting embodiments, the first assembly 100a can comprise a gas port 116 communicating with the channel 102a. The gas port 116 can be configured to allow passage of pressurized gas into the channel 102a and urge rivets to move through the channel 102a toward the second port 108. The gas port 116 can comprise a fitting suitable for connection with a gas input line. The gas port 116 can be disposed proximal to the first port 106 and can selectively introduce pressurized gas into the channel 102a upstream of rivets disposed within the channel 102a, urging rivets in the channel 102a toward second port 108. The gas can comprise, for example, air and/or an inert gas. In certain non-limiting embodiments, the gas port 116 may not be present.

In certain non-limiting embodiments, the first assembly 100a can comprise a gas port 132 communicating with the second port 108. The gas port 132 can be configured to introduce a pressurized gas to the second port 108 to thereby urge rivets to move through the second port 108 and be dispensed from the channel 102a. The gas port 132 can comprise a fitting suitable for connection with a gas input line. The gas can comprise, for example, air and/or an inert gas. In certain non-limiting embodiments, the gas port 132 may not be present.

As shown in FIGS. 2A, 2C, 2D, and 2F, a first gate 112 can be in communication with the second port 108. The first gate 112 can be connected to the rivet receiving member 102 and, in certain non-limiting embodiments, can comprise a pin 112a configured to engage a rivet within the channel 102a. For example, as shown in FIG. 2F, the pin 112a can selectively engage a head of a rivet (e.g., an outer diameter of the rivet) and/or a stem of a rivet in the channel 102a. The first gate 112 can be selectively positioned between a first configuration and a second configuration. When in the first ("closed") configuration, the first gate 112 can inhibit movement of rivets along the channel 102a through the second port 108 (e.g., the pin 112a can enter the channel 102a and block or engage a rivet in the channel 102a). When in the second ("open") configuration, the first gate 112 can allow movement of rivets along the channel 102a and through the second port 108 (e.g., the pin 112a can retract from the channel 102a and allow rivets to move freely through the second gate 112). In various non-limiting embodiments, the first gate 112 can be in a fixed position relative to the channel 102a.

In various non-limiting embodiments, as shown in FIGS. 2A, 2C, and 2F, a second gate 114 can be in communication with the channel 102a. The second gate 114 can be connected to the rivet receiving member 102 and, in certain non-limiting embodiments, can comprise a pin 114a configured to engage a rivet within the channel 102a. For example, the pin 114a can engage a head and/or a stem of a rivet within the channel 102a. The second gate 114 can be selectively positioned between a first configuration and a second configuration. When in the first (e.g., "closed") configuration, the second gate 114 can inhibit movement of rivets along the channel 102a (e.g., the pin 114a can enter the channel 102a and block or engage a rivet in the channel 102a). When in the second (e.g., "open") configuration, the second gate 114 can allow movement of rivets along the channel 102a (e.g., the pin 114a can retract from the channel 102a and allow rivets to move freely through the second gate 114). In various non-limiting embodiments, the second gate 114 can be in a fixed position relative to the channel 102a.

In various non-limiting embodiments, to release rivets from the channel 102a of the rivet receiving member 102, the second gate 114 and the first gate 112 can be positioned in the second configuration. The gas port 116 can introduce pressurized gas into the channel 102a to dispense the rivets from the channel 102a within the rivet receiving member 102. Once the rivets are dispensed from the channel 102a, the first gate 112 can be positioned in the first configuration to inhibit the traversal of rivets through the second port 108 and enable storage of rivets within the channel 102a.

The second gate 114 can be configured to selectively allow movement of a single rivet at one time through the second port 108 to be dispensed from the channel 102a, while inhibiting movement of additional rivets from the channel 102a through the second port 108. For example, the first gate 112 can be intermediate the second gate 114 and the second port 108. The second gate 114 can be placed in the first configuration, and a single rivet can be intermediate the second gate 114 and the first gate 112. The first gate 112 can be placed in the second configuration to enable movement of the single rivet through the second port 108. In various non-limiting embodiments, when in their second configurations, the first gate 112 engages a head of a rivet and the second gate 114 engages a stem of a rivet in the channel 102a.

In various non-limiting embodiments, the first gate 112 and the second gate 114 can be selectively positioned in the first configuration or the second configuration pneumatically, by operation of an electric servo motor and/or an electric solenoid. In various non-limiting embodiments, a switch or sensor can be associated with the first gate 112 and/or the second gate 114 to monitor whether the gate 112, 114 is in a first configuration or a second configuration.

In various non-limiting embodiments, referring to FIGS. 10A-C, a rivet receiving member 902 of the first assembly 900a can comprise a moveable gate 1098. The moveable gate 1098 can be slidably connected to the rivet receiving member 902 and, in certain non-limiting embodiments, can comprise a pin 1098a configured to engage a rivet within a channel 902a defined within the rivet receiving member 902. For example, as shown in FIG. 10C, a pin 1098a of the moveable gate can selectively engage a head of a rivet (e.g., an outer diameter of the rivet) and/or a stem of a rivet in the channel 902a. The moveable gate 1098 can be selectively positioned between a first configuration and a second configuration. When in the first ("closed") configuration, the moveable gate 1098 can inhibit movement of rivets along the channel 902a through the second port 908 (e.g., the pin 1098a can enter the channel 902a and block or engage a rivet in the channel 902a). When in the second ("open") configuration, the moveable gate 1098 can allow movement of rivets along the channel 902a and through the second port 108 (e.g., the pin 1098a can retract from the channel 902a and allow rivets to move freely through the moveable gate 1098).

The moveable gate 1098 can comprise an actuation member 1098b configured to change the position of the moveable gate 1098 with respect to the channel 902a. For example, as illustrated in FIG. 10A-B, the moveable gate 1098 can change from a first position 1098' with respect to the channel 902a to a second position 1098" with respect to the channel 902a. The change in position of the moveable gate 1098 also changes which rivets are inhibited from moving along channel 902a when the moveable gate 1098 is in the first configuration and the first gate 112 is in the second configuration. The moveable gate 1098 can be positioned in any intermediate position between the first position 1098' and the second position 1098", as desired. Thus, the moveable gate 1098 can be positioned to adjust the quantity of rivets 1066 dispensed when the first gate 112 is in the second configuration.

As shown in FIG. 2A, in various non-limiting embodiments, the first assembly 100a can comprise a locking pin 138 in a position adjacent to the second port 108. The locking pin 138 can be configured, for example, to engage a pin receiving bore of a resistance spot rivet welding apparatus comprising a rivet dispenser to secure the resistance spot rivet welding apparatus to the rivet dispenser reloading system 100 in an orientation so that the rivet dispenser reloading system 100 can feed rivets into the rivet dispenser. The locking pin 138 can be operatively coupled to a pneumatic cylinder, a guide bushing, and/or a mounting plate, for example. A switch and/or sensor can be associated with the locking pin 138 to monitor the position of the locking pin 138. The locking pin 138 can be operated pneumatically or by action of an electric servo motor to secure the rivet dispenser reloading system 100 to a resistance spot rivet welding apparatus. In certain non-limiting embodiments, the locking pin 138 may not be present.

A sensor 136 can be configured to detect an orientation of rivets within the channel 102a, the quantity of rivets within the channel 102a, or some other property of the rivets within the channel 102a. The sensor 136 can be connected to the rivet receiving member 102. The sensor 136 may be any suitable sensor configured to detect size, orientation, position, and/or amount of rivets. The type of sensor used may vary depending on the type, size, and/or the configuration of the rivet receiving member 102 and/or the rivets used.

In various non-limiting embodiments, referring to FIG. 10C, the rivet receiving member 902 can comprise a level switch 1068a and a level switch 1068b, which can determine if a rivet is present at a position adjacent to the respective switch 1068a and 1068b in the channel 902a. The determination of a rivet present at a position adjacent to the level switch 1068b indicates that the channel 902a has a desired quantity of rivets 1066. The determination of absence of a rivet at a position adjacent to the level switch 1068a can indicate that the desired quantity of rivets 1066 has been dispensed (e.g., no stuck rivets). In various non-limiting embodiments, once the presence of a rivet is determined in a position adjacent to the level switch 1098b, rivet transfer to the channel 902a can be halted.

In various non-limiting embodiments, the first assembly 100a can comprise an alignment member 128a and an alignment member 128b. The alignment members 128a and 128b can comprise a bushing, a conical pin, and/or a spring/piston to enable axial compliance between the first assembly 100a and a rivet dispenser of a resistance spot rivet welding apparatus. For example, the alignment members 128a and 128b can be received in precisely positioned alignment bushings provided in a resistance spot rivet welding apparatus so that a rivet dispenser of the resistance spot rivet welding apparatus is precisely oriented relative to the rivet receiving member 102 and rivets dispensed through the second port 108 of the rivet receiving member 102 are received in the rivet dispenser. In various non-limiting embodiments, the alignment members 128a and 128b may not comprise a bushing and/or a spring/piston.

In various non-limiting embodiments, the first assembly 100a can include a contact block 134. The contact block 134 can be configured to inhibit transfer of forces between the first assembly 100a and the rivet dispenser of a resistance spot rivet welding apparatus as the rivet dispenser is brought into contact with the first assembly 100a in an orientation so that rivets can be dispensed from the rivet receiving member 102 of the first assembly 100a through the second port 108 and into the rivet dispensers. In certain non-limiting embodiments, the contact block 134 may include spring-mounted pins that absorb force as the rivet dispenser closely approaches the first assembly 100a in a correct orientation. In various non-limiting embodiments, the contact block 134 may include fixed pins.

In various non-limiting embodiments, the first assembly 100a can include additional elements, such as, for example, at least one of a mounting plate, a squaring block, and a shim. The additional elements can enable adjustment of the first assembly 100a in at least three degrees of freedom relative to the fourth assembly 100d of the rivet dispenser reloading system 100.

FIGS. 3A-D illustrate the second assembly 100b of the rivet dispenser reloading system 100. The second assembly 100b can include an electrode dressing component 118 configured to dress a resistance welding electrode of a welding gun of a resistance spot rivet welding apparatus. The construction of the electrode dressing component 118 can vary depending on resistance welding electrode type and/or application of the resistance spot rivet welding apparatus. The electrode dressing component 118 can comprise a set of motor-driven cutting blades, abrasives, and/or buffing pads, which rotate around the centerline of the resistance welding electrode and provide a desired electrode contour. As best shown in FIGS. 1A and 1C, the electrode dressing component 118 can be positioned on the rivet dispenser reloading system 100 in proximity to the second port 108 of the rivet receiving member 102 via a connection to the fourth assembly 100d. In certain non-limiting embodiments, the electrode dressing process can occur using the electrode dressing component 118 of the second assembly while the rivet dispenser of the resistance spot rivet welding apparatus receives rivets from the second port 108 of the rivet receiving member 102 of the first assembly 100a.

The second assembly 100b can be structured to properly align a resistance spot rivet welding apparatus with the rivet dispenser reloading system 100. For example, the second assembly 100b can comprise an alignment member 128c and an alignment member 128d that are received in precisely positioned alignment bushings on the resistance spot rivet welding apparatus. The alignment members 128c, 128d can comprise a bushing, a conical pin, an alignment block, and/or a spring/piston to enable axial compliance between the rivet dispenser reloading system 100 and the resistance spot rivet welding apparatus. In various non-limiting embodiments, the alignment members 128c, 128d may not comprise a bushing and/or a spring/piston.

The alignment members 128a and 128b of the first assembly 100a and the alignment members 128c and 128d of the second assembly 100b can contact a resistance spot rivet welding apparatus prior to any other component of the rivet dispenser reloading system 100. In various non-limiting embodiments, the alignment members 128c and 128d of the second assembly 100b can contact the resistance spot rivet welding apparatus first, and the alignment members 128a and 128b of the first assembly 100a can contact the resistance spot rivet welding apparatus immediately thereafter.

In certain non-limiting embodiments, the alignment members 128a and 128d can be adjustable in three degrees of freedom, for example, via a shim pack, an adjustment block, and/or a cam, so that each alignment member 128a and 128d is in the correct position and orientation to properly align the resistance spot rivet welding apparatus with the first assembly 100a and with the second assembly 100b of the rivet dispenser reloading system 100. For example, the alignment members 128c and 128d can be adjusted relative to the second port 108 of the rivet receiving member 102 of the first assembly 100a to enable alignment of the second port 108 relative to a rivet dispenser of a resistance spot rivet welding apparatus. Also, for example, the alignment members 128c and 128d can be adjusted relative to an electrode dressing component 118 of the second assembly 100b to enable alignment of the electrode dressing component 118 relative to a resistance welding electrode of a welding gun of a resistance spot rivet welding apparatus. A rivet dispenser of the resistance spot rivet welding apparatus can then receive rivets from the first assembly 100a and, if desired, a resistance welding electrode of the welding gun of the resistance spot rivet welding apparatus can be dressed using the electrode dressing component 118 of the second assembly 100b.

In various non-limiting embodiments, the second assembly 100b can comprise additional elements (e.g., compliance devices), such as, for example, at least one of a bolted plate, an adjustment block, and a pin retainer block. The compliance devices can accommodate normal misalignment in positioning during robot learning or day-to-day variation between operations. The compliance devices can enable normal operation with some misalignment and provide a visual cue during robot learning that force is being applied to the rivet dispenser reloading system 100 so that corrections can be made before the rivet dispenser reloading system 100 is damaged.

FIGS. 4A-D depict the third assembly 100c of the rivet dispenser reloading system 100. The third assembly 100c can move relative to the fourth assembly 100d. For example, the third assembly 100c can comprise a first slide 122 and a second slide 124. The first slide 122 and the second slide 124 can enable a resistance spot rivet welding apparatus engaged with the alignment members 128c and 128d to move relative to the first assembly 100a. As indicated in FIGS. 4A-D, the first slide 122 can be configured to enable movement of the third assembly 100c relative to the fourth assembly 100d in a first direction 140a and a second direction 140b. The second slide 124 can be configured to enable access for actuation of the first slide 122 in a third direction 140c and a fourth direction 140d relative to fourth assembly 100d. In the depicted non-limiting embodiments, the third direction 140c and the fourth direction 140d can be substantially perpendicular to the first direction 140a and the second direction 140b. In various non-limiting embodiments, the second slide 124 can be directly connected to the first slide 122.

The third assembly 100c can comprise a contact member 126, which can be in communication with the first slide 122. The contact member 126 can be configured to engage a protrusion of a tensioner of a rivet dispenser and to move utilizing the first slide 122 and/or the second slide 124 responsive to engagement of the contact member 126 with the resistance spot rivet welding apparatus. The engagement can move the tensioner of the rivet dispenser into a reload position in order to enable the rivet dispenser to accept rivets.

In various non-limiting embodiments, the third assembly 100c can comprise a proximity switch configured to detect a position of the first slide 122 and/or the second slide 124. The third assembly 100c can comprise additional elements, such as, for example, at least one of a bolted plate, a linear slide rail and carriage, a pneumatic cylinder, a rod alignment coupler, a stop block, and a shock absorber.

Figure 5:
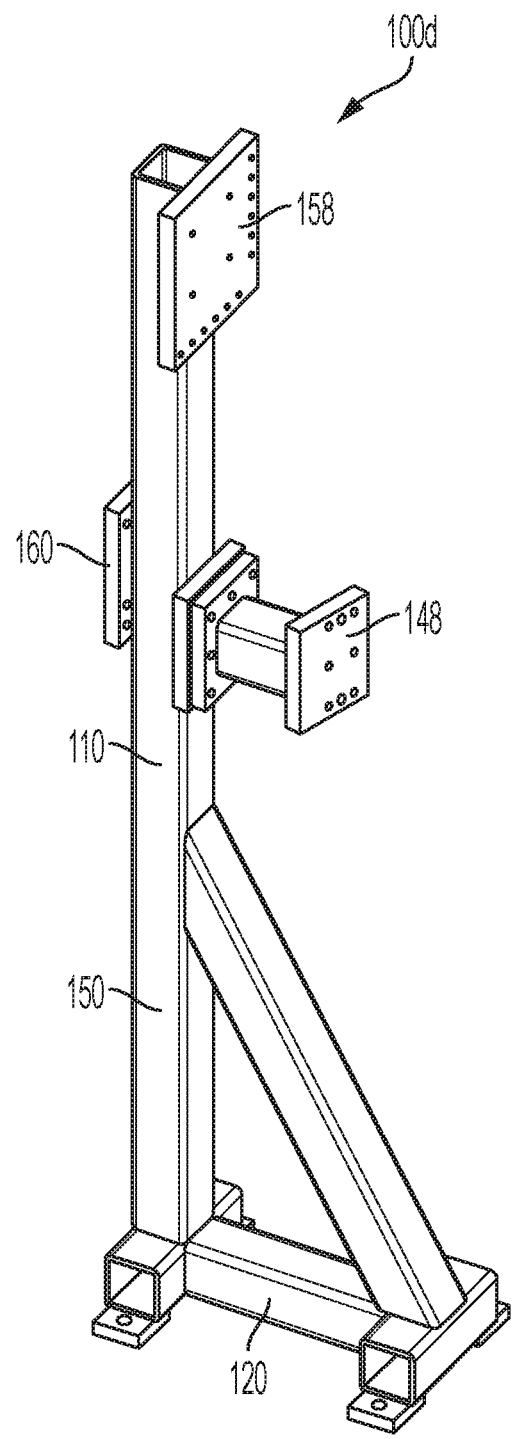
FIG. 5 is a perspective view of a fourth assembly of the rivet dispenser reloading system of FIG. 1A.

FIG. 5 depicts the fourth assembly 100d of the rivet dispenser reloading system 100. The fourth assembly 100d can support the first, second, and third assemblies (100a, 100b, 100c) in a plurality of preselected orientations. The preselected orientations can be chosen such that a resistance spot rivet welding apparatus may have reduced movements when aligning with the rivet dispenser reloading system 100. For example, the fourth assembly 100d can comprise a frame 110 configured to retain the rivet receiving member 102 in a plurality of preselected orientations. In various non-limiting embodiments, the fourth assembly 100d can comprise tubing and plates.

In certain non-limiting embodiments, the frame 110 of the fourth assembly 100d can comprise a base 120, a support column 150, a first attachment region 148, a second attachment region 158, and a third attachment region 160. The base 120 can provide stability to the rivet dispenser reloading system 100 and can be secured to a platform, floor, or other surface with fasteners (e.g., bolts, screws). The support column 150 can transfer force from the first attachment region 148, the second attachment region 158, and the third attachment region 160 to the base 120. The first attachment region 148 can be structured to connect to the second assembly 100b. The second attachment region 158 can be structured to connect to the first assembly 100a. The third attachment region 160 can be structured to connect to the third assembly 100c.

Figure 11:
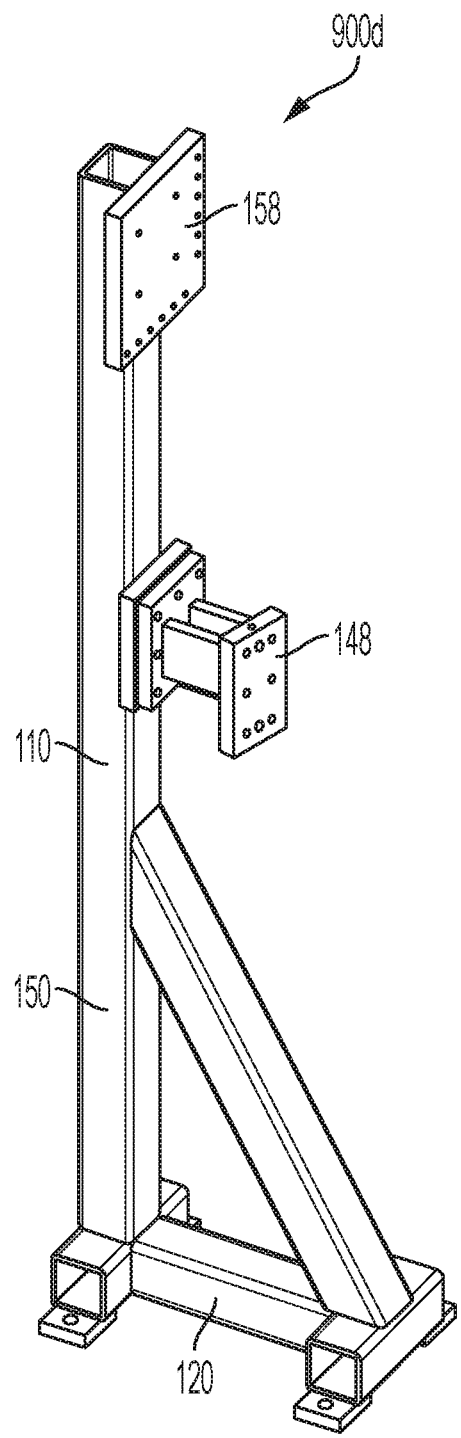
FIG. 11 is a perspective view of a fourth assembly of the rivet dispenser reloading system of FIG. 9A.

In various non-limiting embodiments, as illustrated in FIG. 11, the fourth assembly 900d can comprise a frame 110 comprising a base 120, a support column 150, a first attachment region 148, and a second attachment region 158. The fourth assembly 900d can support the first and second assemblies, 900a and 100b, in a plurality of preselected orientations.

Referring again to FIGS. 1A-D, a fastener feeder can be configured to directly connect to the first port 106 of the first assembly 100a or communicate with the fifth assembly 100e, if present, to introduce fasteners in a preselected orientation to the first port 106. The fastener feeder may not be a part of the rivet dispenser reloading system 100. The fastener feeder is a source of rivets that can be utilized when additional rivets are needed to reload the first assembly 100a in preparation for reloading a rivet dispenser of a resistance spot rivet welding apparatus. The fastener feeder can comprise at least one of a vibratory bowl, a magnetic bowl, a flexible feed track, and/or other collator type. In various examples, referring to FIGS. 12A-D, the fastener feeder is a feed track 1270, which can be aligned and clamped into communication with the first port 106 of the rivet receiving member 102.

Figure 6A:
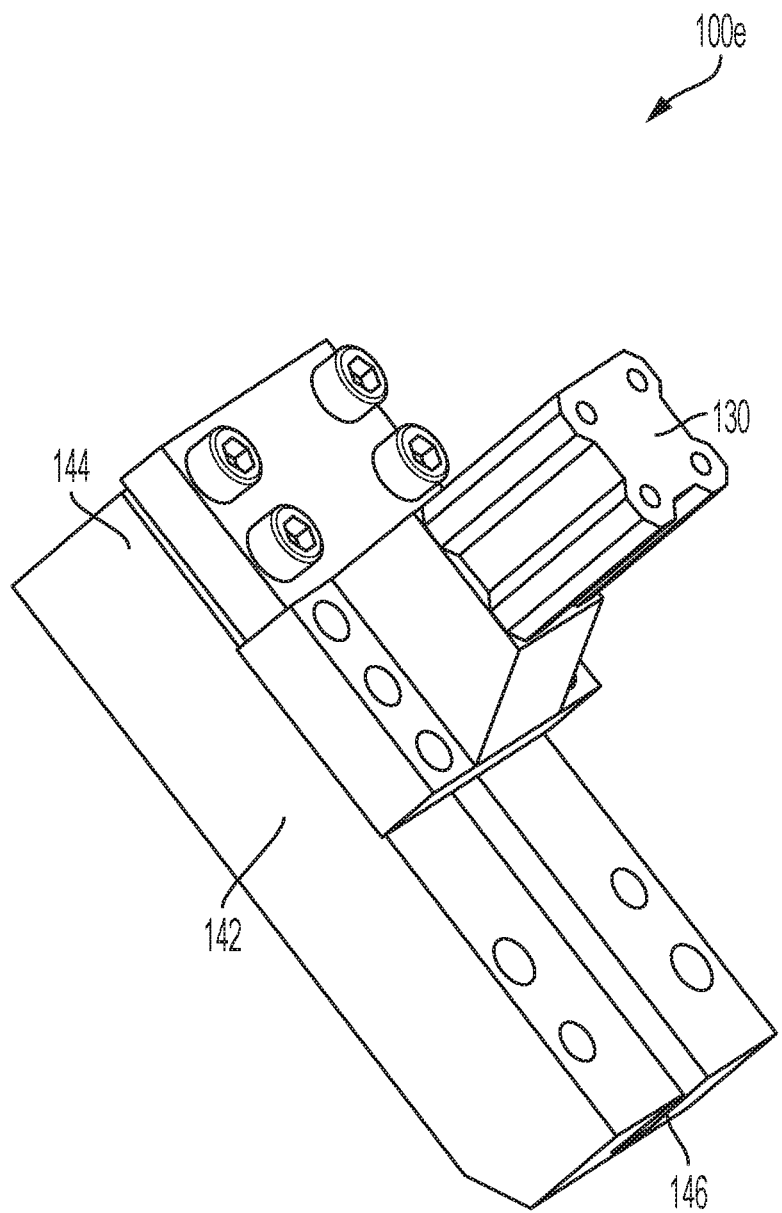
FIG. 6A is a perspective view of a fifth assembly of the rivet dispenser reloading system of FIG. 1A.
Figure 6B:
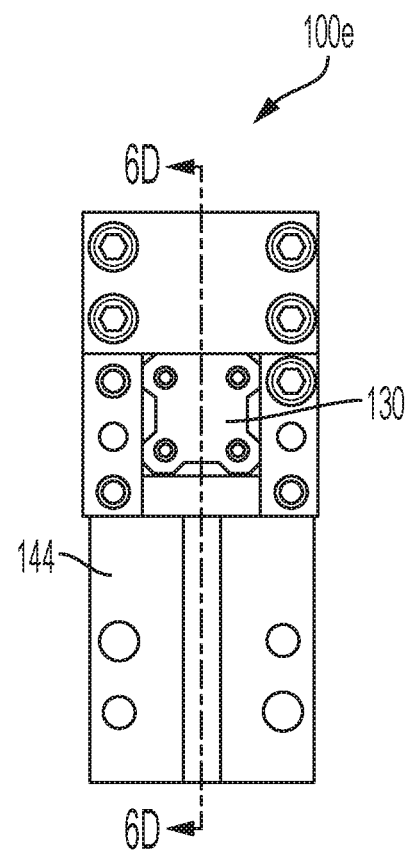
FIG. 6B is a front elevational view of the fifth assembly of FIG. 6A.
Figure 6C:
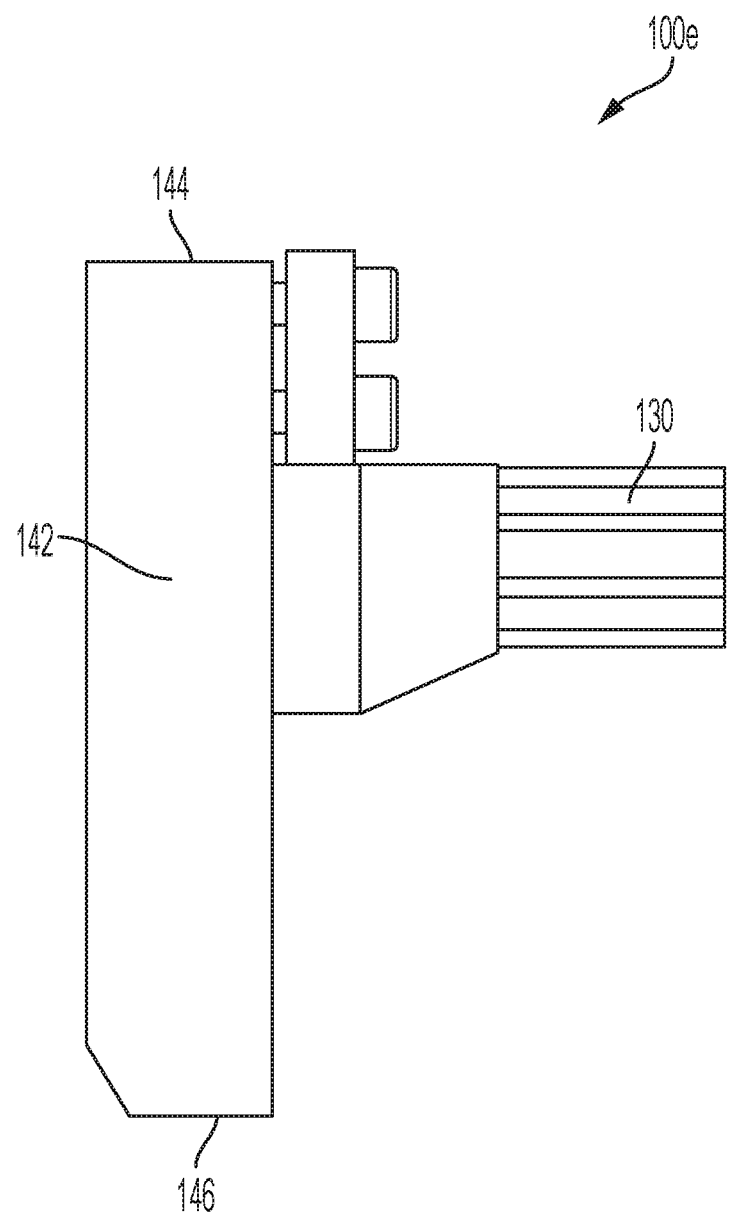
FIG. 6C is a left-side elevational view of the fifth assembly of FIG. 6A.
Figure 6D:
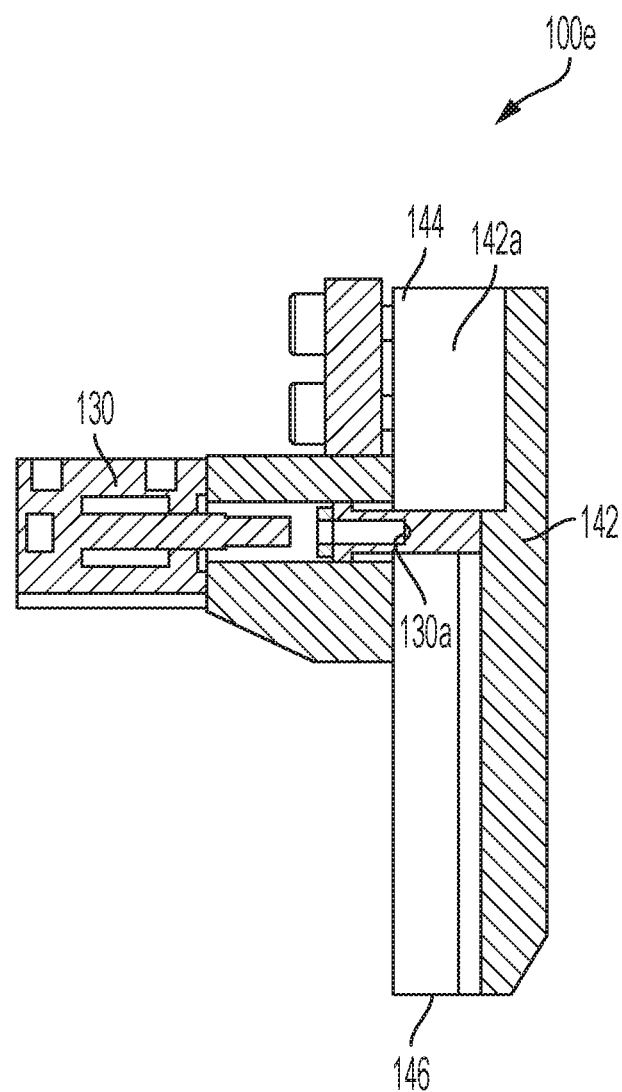
FIG. 6D is a cross-sectional side view of the fifth assembly of FIG. 6A taken along the line 6D-6D in FIG. 6B, in the direction of the arrows.
Figure 6E:
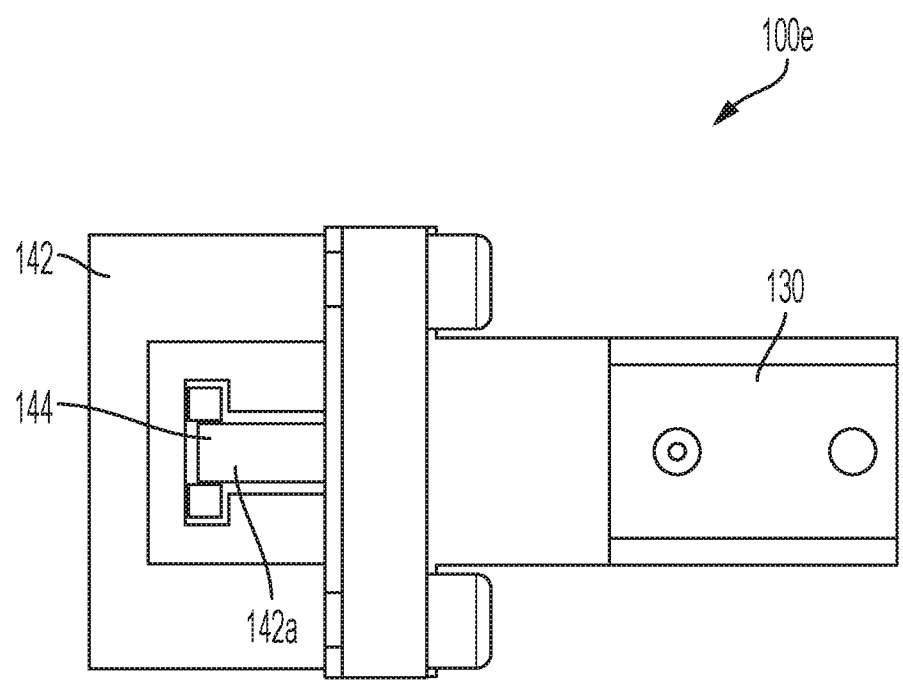
FIG. 6E is a top view of the fifth assembly of FIG. 6A.
Figure 7A:
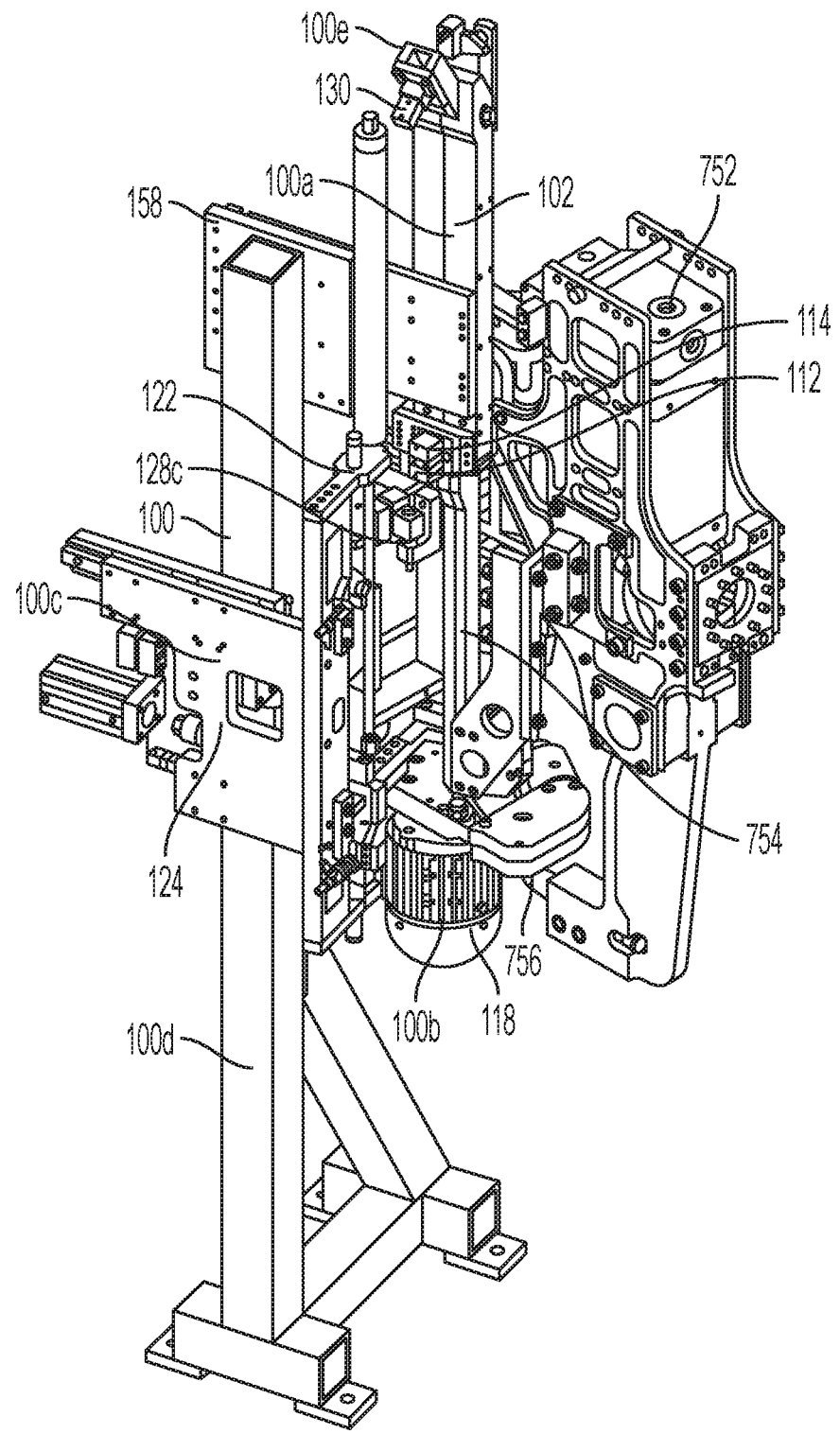
FIG. 7A is a perspective view showing a non-limiting embodiment of a rivet dispenser reloading system according to the present disclosure aligned with an embodiment of a resistance spot rivet welding apparatus.
Figure 7B:
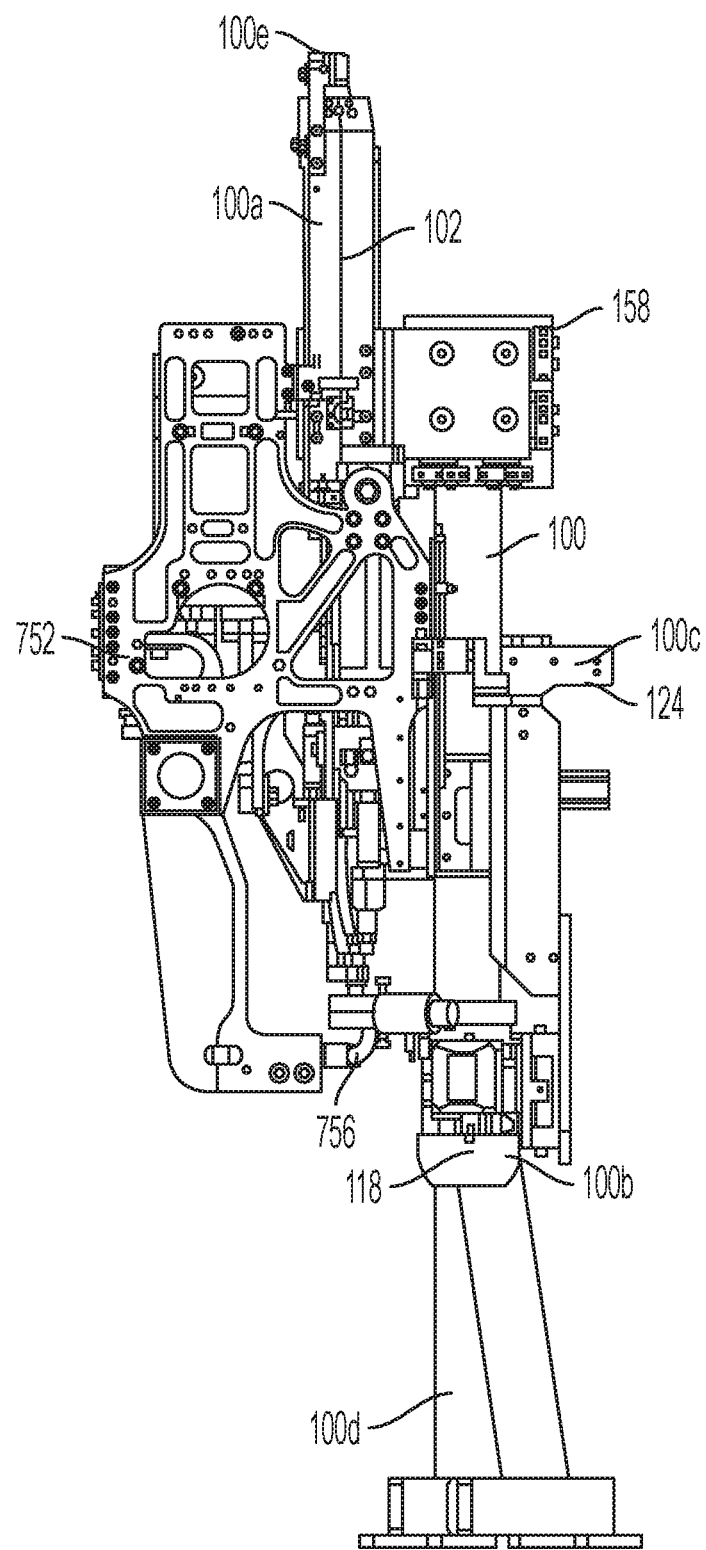
FIG. 7B is a right-side elevational view of the rivet dispenser reloading system and the aligned resistance spot rivet welding apparatus of FIG. 7A.
Figure 7C:
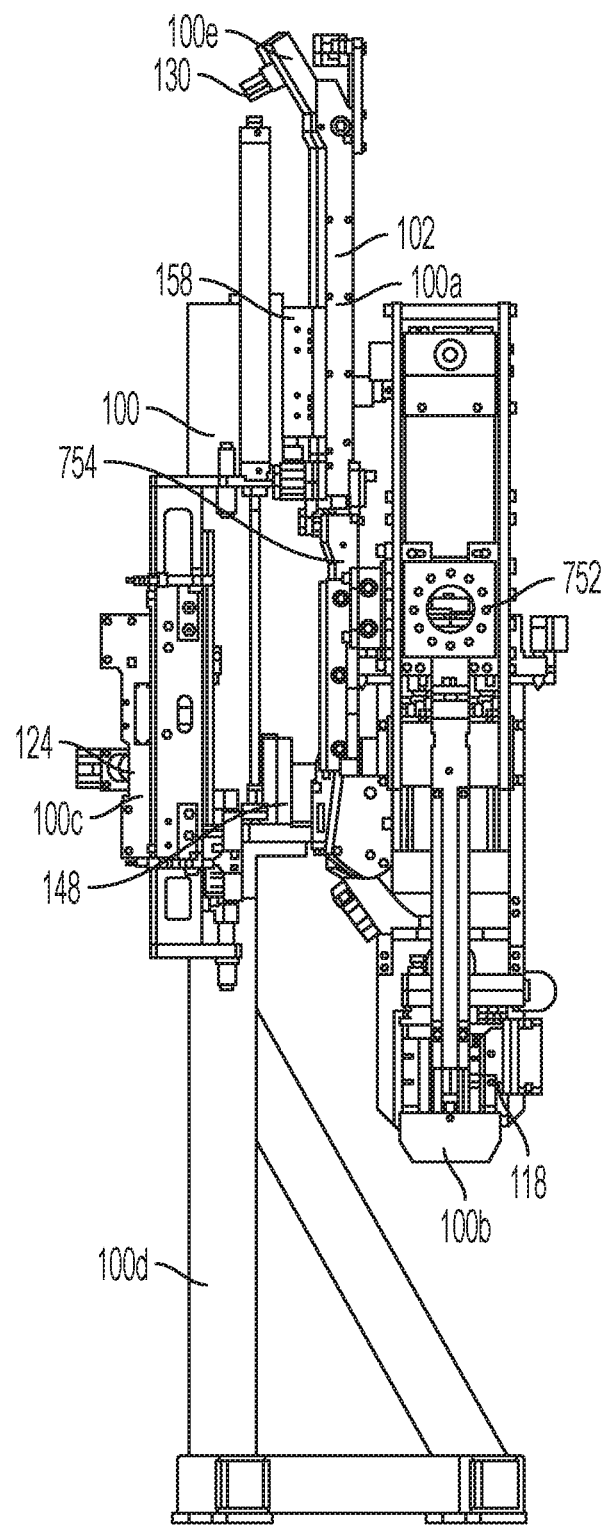
FIG. 7C is a front elevational view of the rivet dispenser reloading system and the aligned resistance spot rivet welding apparatus of FIG. 7A.
Figure 7D:
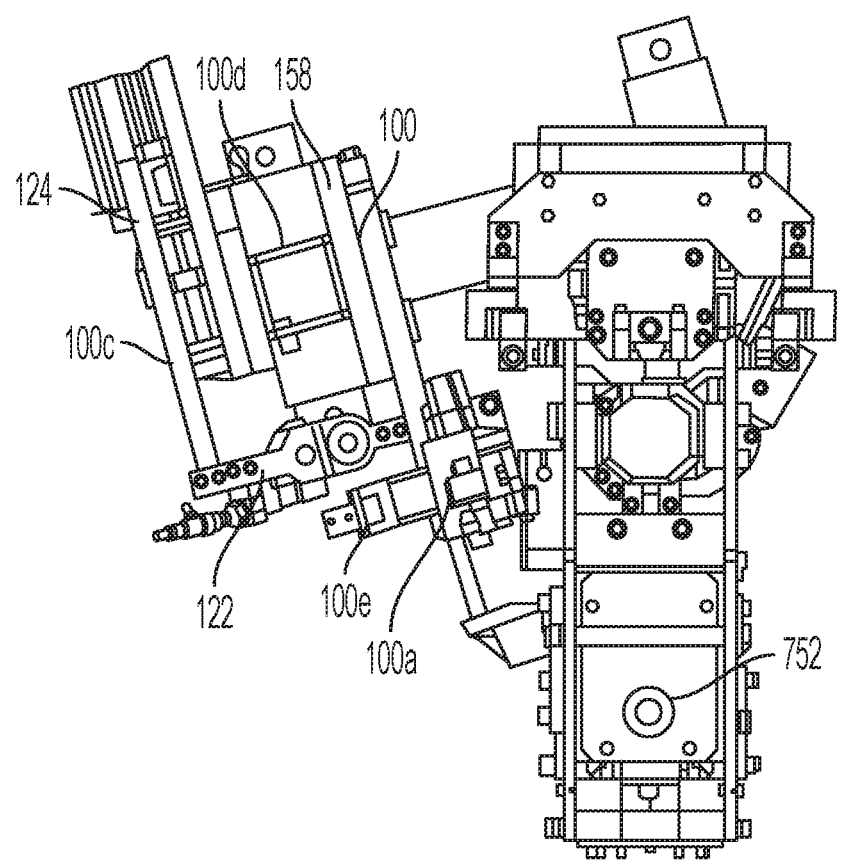
FIG. 7D is a top view of the rivet dispenser reloading system and the aligned resistance spot rivet welding apparatus of FIG. 7A.
Figure 7E:
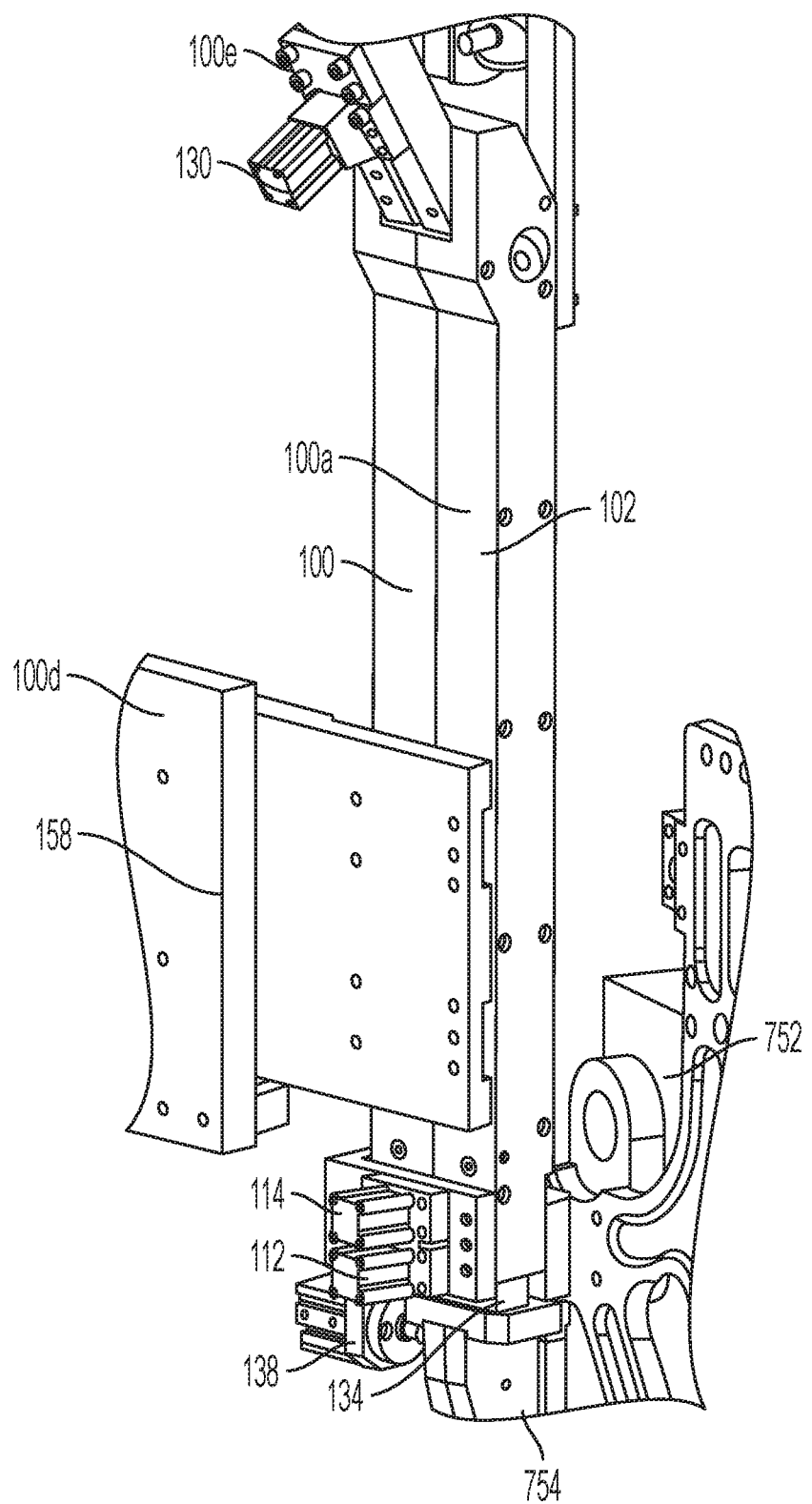
FIG. 7E is a detailed view of the first assembly of the rivet dispenser reloading system mating with the rivet dispenser of the resistance spot rivet welding apparatus of FIG. 7A.

FIGS. 6A-E depict the fifth assembly 100e of the rivet dispenser reloading system 100. Fifth assembly 100e can control the movement of rivets into the first port 106 of the rivet receiving member 102 of the first assembly 100a. For example, the fifth assembly 100e can comprise a secondary rivet receiving member 142 and a third gate 130. As indicated in FIG. 6D, the secondary rivet receiving member 142 can define a channel 142a therein. The secondary rivet receiving member 142 can comprise a first port 144 and a second port 146. The first port 144 can be in communication with the channel 142a and configured to receive rivets from a fastener feeder. The second port 146 can be in communication with the channel 142a and configured to receive rivets. The channel 142a can extend between the first port 144 and the second port 146. The channel 142a can be configured to transport rivets from the first port 144 to the second port 146 in a series arrangement and in a preselected orientation. The channel 142a can be configured to receive a flexible feed track from a fastener feeder and control the release of rivets through the second port 146.

The third gate 130 of the fifth assembly 100e can be in communication with the first port 106 via the channel 142a. The third gate 130 can comprise a pin 130a configured to engage a rivet within the channel 142a. For example, the pin 130a can engage a head and/or a stem of a rivet within the channel 142a. The third gate 130 can be selectively positionable between a first configuration and a second configuration. The first configuration of the third gate 130 can inhibit movement of rivets through the channel 142a (e.g., the pin 130a can enter the channel 142a and engage the rivet) and to the first port 106 of the rivet receiving member 102 of the first assembly 100a. The second configuration of the third gate 130 can allow movement of rivets through the channel 142a (e.g., the pin 130a can retract from the channel 142a) to the first port 106 of the rivet receiving member 102 of the first assembly 100a. In various non-limiting embodiments, the third gate 130 can be pneumatic or actuated by an electric servo motor. A switch or sensor can communicate with the third gate 130 to monitor the configuration of the third gate 130.

To introduce a rivet into the rivet receiving member 102, the third gate 130 and the second gate 114 can be in the second configuration, and the first gate 112 can be in the first configuration. The fifth assembly 100e can comprise additional elements, such as, for example, a clamp plate and a mounting block.

As shown in FIGS. 7A-E, the rivet dispenser reloading system 100 can mate with a resistance spot rivet welding apparatus 752. In certain non-limiting embodiments, as shown in FIGS. 12A-D, the rivet dispenser reloading system 900 can mate with the resistance spot rivet welding apparatus 752. The resistance spot rivet welding apparatus 752 can comprise a rivet dispenser 754 and a welding gun including a resistance welding electrode 756. The rivet dispenser 754 can receive rivets from the first assembly 100a and 900a of the rivet dispenser reloading system 100 and 900, and the resistance welding electrode 756 can be dressed by the second assembly 100b of the rivet dispenser reloading system 100 and 900. For example, rivets can be received by the rivet dispenser 754, and simultaneously the resistance welding electrode 756 can be dressed.

In order to engage and be received by the rivet dispenser reloading system 100 and 900, the resistance spot rivet welding apparatus 752 can move towards the rivet dispenser reloading system 100 and 900 in a substantially horizontal path to align the alignment members 128c and 128d with first alignment bushings on the resistance spot rivet welding apparatus 752. The resistance spot rivet welding apparatus 752 can move in a substantially vertical path towards alignment members 128c and 128d such that the first alignment bushings can receive and engage the alignment members 128c and 128d. Thereafter, the resistance spot rivet welding apparatus 752 can move to align second alignment bushings of the resistance spot rivet welding apparatus 752 with the alignment members 128a and 128b. The resistance spot rivet welding apparatus 752 can move in a substantially vertical path towards alignment members 128a and 128b such that second alignment bushings can receive and engage the alignment members 128a and 128b. When the alignment members 128c and 128d are engaged with first alignment bushings and the alignment members 128a and 128b are engaged with second alignment bushings, the resistance spot rivet welding apparatus 752 has reached a "reload position" in which it is correctly oriented relative to the rivet dispenser reloading system 100 and 900.

In various non-limiting embodiments, referring to FIGS. 7A-E, in the reload position, the second port 108 can be aligned with rivet dispenser 754 and the locking pin 138 can engage and secure the resistance spot rivet welding apparatus 752 in the reload position relative to the rivet dispenser reloading system 100. The first gate 112 can be positioned in the second configuration, and the gas port 116 can introduce pressurized gas into the channel 102a to urge rivets in series and in a preselected orientation from the channel 102a and into the rivet dispenser 754. The pressurized gas can inhibit, if not prevent, jamming of rivets within the channel 102a, shingling of rivets (e.g., overlapping head portions of rivets) within the channel 102a, and gaps between successive rivets within the channel 102a. In various non-limiting embodiments, the resistance welding electrode 756 can be dressed during the reloading of rivets into the rivet dispenser 754 and when the locking pin 138 has been engaged. The locking pin 138 can retain proper alignment of the resistance spot rivet welding apparatus 752 with the rivet dispenser reloading system 100 during dressing of the resistance welding electrode 756 and any operation that may produce significant vibrations.

After reloading, the first gate 112 can be positioned in the first configuration. The locking pin 138 can disengage the resistance spot rivet welding apparatus 752, and the first slide 122 and the second slide 124 can translate to release the resistance spot rivet welding apparatus 752 from the alignment members 128a and 128b. The resistance spot rivet welding apparatus 752 can move in a substantially vertical path away from the alignment members 128c and 128d, and then the resistance spot rivet welding apparatus 752 can move in a substantially horizontal path away from the rivet dispenser reloading system 100. Recharged with rivets, the resistance spot rivet welding apparatus 752 can resume its programmed riveting operation.

The present disclosure also provides a method for reloading rivets into a rivet dispenser of a resistance spot rivet welding apparatus. According to the method, a plurality of rivets can be received and stored within a channel of a rivet receiving member of a rivet dispenser reloading system utilizing a gate associated with the channel. The plurality of rivets can be stored in the channel in a series arrangement and in the same preselected orientation. The rivet dispenser of the resistance spot rivet welding apparatus can be correctly aligned with the rivet receiving member utilizing an alignment member of the rivet dispenser reloading system in communication with the resistance spot rivet welding apparatus. The gate is selectively positionable between a first configuration inhibiting movement of rivets from the channel, and a second configuration enabling movement of rivets from the channel and into the rivet dispenser of the resistance spot rivet welding apparatus. When the gate is in the second configuration, the plurality of rivets stored in the channel can be introduced into the rivet dispenser in a series arrangement and in the preselected orientation utilizing the gate. In certain non-limiting embodiments, the rivets stored in the channel can be introduced into the rivet dispenser by introducing a pressurized gas into the channel to urge the rivets from the channel. In certain non-limiting embodiments, a rivet can be received and stored within the channel concurrently with the resistance spot rivet welding apparatus utilizing a rivet (e.g., dispensing a rivet from the rivet dispenser).

The rivet dispenser reloading system, according to the present disclosure, can replenish rivets consumed by a resistance spot rivet welding apparatus. The reloading of rivets can be accomplished reliably within a predetermined time period to reduce riveting apparatus cycle time. The rivet capacity of the rivet dispenser reloading system according to the present disclosure can be configured based on the size of the rivet dispenser of the resistance spot rivet welding apparatus.

As used herein, "machine cycle time" is a duration of time required for a production system to proceed from any given point and return back to that same point in the next cycle. For example, a production system with a machine cycle time of 60 seconds to produce a single part can produce parts at the rate of 60 per hour (i.e., 60 machine cycles per hour).

As used herein, "transfer time" is a duration of time during which riveting cannot occur due to the need to move parts from one station to another station in a manufacturing facility. For example, transfer time includes time during which riveted components are being unloaded from a riveting station after riveting and new (un-riveted) components are being loaded into the same riveting fixture to be riveted.

In one example, an automotive component being joined may require N rivets per machine cycle, and the rivet dispenser of a resistance spot rivet welding apparatus can be configured with a capacity of X rivets, wherein X is greater than or equal to N. The resistance spot rivet welding apparatus would have consumed N rivets once a machine cycle is complete, at which point there would be (X−N) rivets remaining in the rivet dispenser of the resistance spot rivet welding apparatus. To minimize changes (e.g., increases) in the machine cycle time, N rivets can be reloaded into the rivet dispenser using a rivet dispenser reloading system as described herein during the transfer time, regardless of the capacity of the rivet dispenser (i.e., X). Delaying the reloading of the rivet dispenser until the remaining (X−N) rivets are consumed may increase machine cycle time if reloading takes place during time that riveting can occur.

In various non-limiting embodiments, the capacity X of the rivet dispenser of the resistance spot rivet welding apparatus can be at least 2N such that multiple machine cycles can occur before the rivet dispenser of the resistance spot rivet welding apparatus must be reloaded. During the reloading, the rivet dispenser reloading system can fill the rivet dispenser to its capacity X.

Dressing of a resistance welding electrode of a welding gun of a resistance spot rivet welding apparatus and reloading of the rivet dispenser can occur at a rivet dispenser reloading system according to the present disclosure within the transfer time in order to avoid or minimize increases to machine cycle time.

A reload of the channel of a rivet dispenser from the rivet dispenser reloading system and a weld cap dressing process can occur in less than 60 seconds, such as, for example, less than 30 seconds, less than 20 seconds, less than 15 seconds, less than 13 seconds, less than 10 seconds, less than 6 seconds, or less than 5 seconds.

Various aspects of certain non-limiting embodiments the inventions encompassed by the present disclosure include, but are not limited to, the aspects listed in the following numbered clauses.

1. A rivet dispenser reloading system comprising:
    a rivet receiving member defining a channel therein, the rivet receiving member comprising
        a first port communicating with the channel and configured to receive rivets, and
        a second port communicating with the channel and configured to selectively engage with a rivet dispenser and introduce rivets to the rivet dispenser,
        wherein the channel extends between the first port and the second port and is configured to transport rivets from the first port to the second port in a series arrangement and in a preselected orientation; and
    a first gate in communication with the second port, wherein the first gate is selectively positionable between a first configuration inhibiting movement of rivets through the second port, and a second configuration enabling movement of rivets through the second port.
2. The rivet dispenser reloading system of clause 1, further comprising a second gate in communication with the channel, the second gate configured to enable movement of a single rivet in the channel through the second port at one time, while inhibiting movement of additional rivets in the channel through the second port.
3. The rivet dispenser reloading system of clause 2, wherein at least one of the first gate and the second gate comprises a pin configured to engage at least one of a stem region and a head region of a rivet.
4. The rivet dispenser reloading system of any one of clauses 1-3, further comprising a second gate in communication with the first port, wherein the second gate is selectively positionable between a first configuration inhibiting movement of rivets through the first port, and a second configuration enabling movement of rivets through the first port.
5. The rivet dispenser reloading system of any one of clauses 1-4, further comprising a moveable gate slidably connected to the rivet receiving member, the moveable gate configured to enable movement of a single rivet in the channel through the second port at one time, while inhibiting movement of additional rivets in the channel through the second port.
6. The rivet dispenser reloading system of clause 5, further comprising an actuation member configured to change the position of the moveable gate relative to the channel.
7. The rivet dispenser reloading system of any one of clauses 1-6, further comprising a gas port communicating with the channel, the gas port configured to introduce a pressurized gas to the channel and thereby urge rivets to move through the channel from the first port to the second port.
8. The rivet dispenser reloading system of any one of clauses 1-7, further comprising
    a fastener feeder configured to introduce fasteners in a preselected orientation to the first port.
9. The rivet dispenser reloading system of clause 8, wherein the fastener feeder comprises at least one of a vibratory bowl, a magnetic bowl, a flexible feed track, and other collator type.
10. The rivet dispenser reloading system of any one of clauses 1-9, further comprising an electrode dressing component associated with the second port of the rivet receiving member, the electrode dressing component configured to dress a resistance welding electrode of a welding gun of a resistance spot rivet welding apparatus as the rivet dispenser receives rivets from the second port.

11. The rivet dispenser reloading system of clause 10, further comprising a frame configured to retain the rivet receiving member in a plurality of preselected orientations.

12. The rivet dispenser reloading system of any one of clauses 1-11, further comprising an alignment member in communication with the rivet receiving member and configured to facilitate alignment between the rivet receiving member and a resistance spot rivet welding apparatus.

13. The rivet dispenser reloading system of clause 12, wherein the alignment member comprises a conical pin.

14. The rivet dispenser reloading system of any one of clauses 12-13, further comprising a spring or piston in communication with the alignment member.

15. The rivet dispenser reloading system of any one of clauses 1-14, further comprising a contact block in communication with the second port and configured to engage the rivet dispenser.

16. The rivet dispenser reloading system of any one of clauses 1-15, further comprising a sensor configured to detect at least one of an orientation of rivets within the channel and a quantity of rivets within the channel.

17. The rivet dispenser reloading system of any one of clauses 1-16, further comprising a locking pin configured to engage and secure a resistance spot rivet welding apparatus comprising the rivet dispenser to the rivet dispenser reloading system.

18. A method for reloading rivets into a rivet dispenser used with a resistance spot rivet welding system, the method comprising
receiving and storing a plurality of rivets in a series arrangement and in a preselected orientation within a channel of a rivet receiving member of a rivet dispenser reloading system, wherein the rivet dispenser reloading system comprises a gate associated with the channel, wherein the gate is selectively positionable between a first configuration inhibiting movement of rivets from the channel, and a second configuration enabling movement of rivets from the channel;
aligning a rivet dispenser of a resistance spot rivet welding system with the rivet receiving member utilizing an alignment member in communication with the resistance spot rivet welding apparatus; and
introducing the plurality of rivets stored in the channel into the rivet dispenser in series and in the preselected orientation via the gate.

19. The method of clause 18, wherein introducing the plurality of rivets stored in the channel into the rivet dispenser comprises introducing a pressurized gas into the channel to urge the plurality of rivet from the channel and through the gate.

20. The method of any one of clauses 18-19, wherein a rivet of the plurality of rivets is received in the channel concurrently with the resistance spot rivet welding apparatus system utilizing a rivet.

One skilled in the art will recognize that the herein described articles and methods, and the discussion accompanying them, are used as examples for the sake of conceptual clarity and that various configuration modifications are contemplated. Consequently, as used herein, the specific examples/embodiments set forth and the accompanying discussion is intended to be representative of their more general classes. In general, use of any specific exemplar is intended to be representative of its class, and the non-inclusion of specific components, devices, operations/actions, and objects should not be taken to be limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:

1. A rivet dispenser reloading system comprising:
a rivet receiving member defining a channel therein, the rivet receiving member comprising
a first port communicating with the channel and configured to receive rivets, and
a second port communicating with the channel and configured to selectively engage with a rivet dispenser and introduce rivets to the rivet dispenser, wherein the channel extends between the first port and the second port and is configured to transport rivets from the first port to the second port in a series arrangement and in a preselected orientation;
a first gate in communication with the second port, wherein the first gate is selectively positionable between a first configuration inhibiting movement of rivets through the second port, and a second configuration enabling movement of rivets through the second port; and
an alignment member in communication with the rivet receiving member and configured to facilitate alignment between the rivet receiving member and a resistance spot welding apparatus.

2. The rivet dispenser reloading system of claim 1, further comprising a second gate in communication with the channel, the second gate configured to enable movement of a single rivet in the channel through the second port at one time, while inhibiting movement of additional rivets in the channel through the second port.

3. The rivet dispenser reloading system of claim 2, wherein at least one of the first gate and the second gate comprises a pin configured to engage at least one of a stem region and a head region of a rivet.

4. The rivet dispenser reloading system of claim 1, further comprising a moveable gate slidably connected to the rivet receiving member, the moveable gate configured to enable movement of a single rivet in the channel through the second port at one time, while inhibiting movement of additional rivets in the channel through the second port.

5. The rivet dispenser reloading system of claim 4, further comprising an actuation member configured to change the position of the moveable gate relative to the channel.

6. The rivet dispenser reloading system of claim 1, further comprising a fastener feeder configured to introduce fasteners in a preselected orientation to the first port.

7. The rivet dispenser reloading system of claim 6, wherein the fastener feeder comprises at least one of a vibratory bowl, a magnetic bowl, a flexible feed track, and other collator type.

8. The rivet dispenser reloading system of claim 1, further comprising an electrode dressing component associated with the second port of the rivet receiving member, the electrode dressing component configured to dress a resistance welding electrode of a welding gun of a resistance spot rivet welding apparatus as the rivet dispenser receives rivets from the second port.

9. The rivet dispenser reloading system of claim 8, further comprising a frame configured to retain the rivet receiving member in a plurality of preselected orientations.

10. The rivet dispenser reloading system of claim 1, further comprising a second gate in communication with the first port, wherein the second gate is selectively positionable between a first configuration inhibiting movement of rivets through the first port, and a second configuration enabling movement of rivets through the first port.

11. The rivet dispenser reloading system of claim 1, further comprising a gas port communicating with the channel, the gas port configured to introduce a pressurized gas to the channel and thereby urge rivets to move through the channel from the first port to the second port.

12. The rivet dispenser reloading system of claim 1, wherein the alignment member comprises a conical pin.

13. The rivet dispenser reloading system of claim 1, further comprising a contact block in communication with the second port and configured to engage the rivet dispenser.

14. The rivet dispenser reloading system of claim 1, further comprising a sensor configured to detect at least one of an orientation of rivets within the channel and a quantity of rivets within the channel.

15. The rivet dispenser reloading system of claim 1, wherein the alignment member comprises at least one of a bushing, conical pin, a spring, and a piston.

16. A rivet dispenser reloading system comprising:
a rivet receiving member defining a channel therein, the rivet receiving member comprising
a first port communicating with the channel and configured to receive rivets, and
a second port communicating with the channel and configured to selectively engage with a rivet dispenser and introduce rivets to the rivet dispenser,
wherein the channel extends between the first port and the second port and is configured to transport rivets from the first port to the second port in a series arrangement and in a preselected orientation;
a first gate in communication with the second port, wherein the first gate is selectively positionable between a first configuration inhibiting movement of rivets through the second port, and a second configuration enabling movement of rivets through the second port;
an alignment member in communication with the rivet receiving member and configured to facilitate alignment between the rivet receiving member and a resistance spot welding apparatus; and
a spring or piston in communication with the alignment member.

17. A rivet dispenser reloading system comprising:
a rivet receiving member defining a channel therein, the rivet receiving member comprising
a first port communicating with the channel and configured to receive rivets, and
a second port communicating with the channel and configured to selectively engage with a rivet dispenser and introduce rivets to the rivet dispenser,
wherein the channel extends between the first port and the second port and is configured to transport rivets from the first port to the second port in a series arrangement and in a preselected orientation;
a first gate in communication with the second port, wherein the first gate is selectively positionable between a first configuration inhibiting movement of rivets through the second port, and a second configuration enabling movement of rivets through the second port;
an alignment member in communication with the rivet receiving member and configured to facilitate alignment between the rivet receiving member and a resistance spot welding apparatus; and
a locking pin configured to engage and secure a resistance spot rivet welding apparatus comprising the rivet dispenser to the rivet dispenser reloading system.

18. A method for reloading rivets into a rivet dispenser used with a resistance spot rivet welding system, the method comprising
receiving and storing a plurality of rivets in a series arrangement and in a preselected orientation within a channel of a rivet receiving member of a rivet dispenser reloading system, wherein the rivet dispenser reloading system comprises a gate associated with the channel, wherein the gate is selectively positionable between a first configuration inhibiting movement of rivets from the channel, and a second configuration enabling movement of rivets from the channel;
aligning a rivet dispenser of a resistance spot rivet welding system with the rivet receiving member utilizing an alignment member in communication with the resistance spot welding apparatus; and
introducing the plurality of rivets stored in the channel into the rivet dispenser in series and in the preselected orientation via the gate.

19. The method of claim 18, wherein introducing the plurality of rivets stored in the channel into the rivet dispenser comprises introducing a pressurized gas into the channel to urge the plurality of rivet from the channel and through the gate.

20. The method of claim 18, wherein a rivet of the plurality of rivets is received in the channel concurrently with the resistance spot rivet welding apparatus system utilizing a rivet.

* * * * *